(12) United States Patent
Gazit et al.

(10) Patent No.: US 9,000,617 B2
(45) Date of Patent: Apr. 7, 2015

(54) DIRECT CURRENT POWER COMBINER

(75) Inventors: Meir Gazit, Ashkelon (IL); Tzachi Glovinsky, Petach Tikva (IL)

(73) Assignee: Solaredge Technologies, Ltd., Hod Hasharon (IL)

( * ) Notice: Subject to any disclaimer, the term of this patent is extended or adjusted under 35 U.S.C. 154(b) by 331 days.

(21) Appl. No.: 12/435,549

(22) Filed: May 5, 2009

(65) Prior Publication Data
US 2009/0273241 A1   Nov. 5, 2009

Related U.S. Application Data

(60) Provisional application No. 61/050,268, filed on May 5, 2008.

(51) Int. Cl.
*H02J 1/10* (2006.01)
*H02J 1/12* (2006.01)

(52) U.S. Cl.
CPC .... *H02J 1/12* (2013.01); *H02J 1/10* (2013.01)

(58) Field of Classification Search
USPC ............ 307/42, 83, 71, 72, 75–78, 82, 17, 50
See application file for complete search history.

(56) References Cited

U.S. PATENT DOCUMENTS

| | | | |
|---|---|---|---|
| 2,758,219 A * | 8/1956 | Miller | 307/12 |
| 3,369,210 A | 2/1968 | Manickella | |
| 3,596,229 A | 7/1971 | Hohorst | |
| 3,958,136 A | 5/1976 | Schroeder | |
| 4,060,757 A * | 11/1977 | McMurray | 363/57 |
| 4,101,816 A | 7/1978 | Shepter | |
| 4,161,771 A | 7/1979 | Bates | |
| 4,171,861 A | 10/1979 | Hohorst | |
| 4,257,087 A | 3/1981 | Cuk | |

(Continued)

FOREIGN PATENT DOCUMENTS

| | | |
|---|---|---|
| CN | 1309451 A | 8/2001 |
| CN | 101136129 A | 3/2008 |

(Continued)

OTHER PUBLICATIONS

Walker G R: "Cascaded DC-DC converter connection of photovoltaic modules" 33rd Annual IEEE Power Electronics Specialists Conference. PESC 2002. Conference Proceedings. Cairns, Queensland, Australia, Jun. 23-27, 2002; [Annual Power Electronics Specialists Conference], New York, NY : IEEE, US, vol. 1, Jun. 23, 2002, pp. 24-29, XP010596060 ISBN: 978-0-7803-7262-7 figure 1.

(Continued)

*Primary Examiner* — Fritz M Fleming
(74) *Attorney, Agent, or Firm* — Banner & Witcoff, Ltd.

(57) ABSTRACT

A circuit for combining direct current (DC) power including multiple direct current (DC) voltage inputs; multiple inductive elements connected in a series circuit having first and second end terminals and intermediate terminals. The inductive elements are adapted for operatively connecting respectively to the DC voltage inputs at the first and second end terminals and intermediate terminals. Multiple switches connect respectively with the inductive elements. A controller is configured to switch the switches periodically so that direct currents flowing through the inductive elements are substantially zero. A direct current voltage output is connected across one of the DC voltage inputs and a common reference to both the inputs and the output.

22 Claims, 8 Drawing Sheets

(56) References Cited

U.S. PATENT DOCUMENTS

| | | | |
|---|---|---|---|
| 4,296,461 A * | 10/1981 | Mallory et al. | 363/22 |
| 4,452,867 A | 6/1984 | Conforti | |
| 4,460,232 A | 7/1984 | Sotolongo | |
| 4,481,654 A * | 11/1984 | Daniels et al. | 378/110 |
| 4,549,254 A | 10/1985 | Kissel | |
| 4,554,515 A | 11/1985 | Burson et al. | |
| 4,598,330 A | 7/1986 | Woodworth | |
| 4,602,322 A | 7/1986 | Merrick | |
| 4,623,753 A | 11/1986 | Feldman et al. | |
| 4,637,677 A | 1/1987 | Barkus | |
| 4,639,844 A | 1/1987 | Gallios et al. | |
| 4,641,042 A | 2/1987 | Miyazawa | |
| 4,641,079 A | 2/1987 | Kato et al. | |
| 4,644,458 A | 2/1987 | Harafuji et al. | |
| 4,652,770 A | 3/1987 | Kumano | |
| 4,685,040 A | 8/1987 | Steigerwald et al. | |
| 4,686,617 A | 8/1987 | Colton | |
| 4,706,181 A | 11/1987 | Mercer | |
| 4,720,667 A | 1/1988 | Lee et al. | |
| 4,720,668 A | 1/1988 | Lee et al. | |
| 4,783,728 A | 11/1988 | Hoffman | |
| RE33,057 E | 9/1989 | Clegg et al. | |
| 4,864,213 A | 9/1989 | Kido | |
| 4,868,379 A | 9/1989 | West | |
| 4,888,063 A | 12/1989 | Powell | |
| 4,888,702 A | 12/1989 | Gerken et al. | |
| 4,899,269 A | 2/1990 | Rouzies | |
| 4,903,851 A | 2/1990 | Slough | |
| 4,906,859 A * | 3/1990 | Kobayashi et al. | 307/17 |
| 4,910,518 A | 3/1990 | Kim et al. | |
| 4,978,870 A | 12/1990 | Chen et al. | |
| 4,987,360 A | 1/1991 | Thompson | |
| 5,045,988 A | 9/1991 | Gritter et al. | |
| 5,081,558 A | 1/1992 | Mahler | |
| 5,191,519 A | 3/1993 | Kawakami | |
| 5,280,232 A | 1/1994 | Kohl et al. | |
| 5,287,261 A | 2/1994 | Ehsani | |
| 5,289,361 A | 2/1994 | Vinciarelli | |
| 5,327,071 A | 7/1994 | Frederick et al. | |
| 5,345,375 A | 9/1994 | Mohan | |
| 5,402,060 A | 3/1995 | Erisman | |
| 5,446,645 A | 8/1995 | Shirahama et al. | |
| 5,460,546 A | 10/1995 | Kunishi et al. | |
| 5,493,154 A | 2/1996 | Smith et al. | |
| 5,497,289 A | 3/1996 | Sugishima et al. | |
| 5,517,378 A | 5/1996 | Asplund et al. | |
| 5,530,335 A | 6/1996 | Decker et al. | |
| 5,548,504 A | 8/1996 | Takehara | |
| 5,563,780 A * | 10/1996 | Goad | 363/71 |
| 5,604,430 A | 2/1997 | Decker et al. | |
| 5,616,913 A | 4/1997 | Litterst | |
| 5,644,219 A | 7/1997 | Kurokawa | |
| 5,646,501 A | 7/1997 | Fishman et al. | |
| 5,659,465 A | 8/1997 | Flack et al. | |
| 5,686,766 A | 11/1997 | Tamechika | |
| 5,773,963 A | 6/1998 | Blanc et al. | |
| 5,777,515 A | 7/1998 | Kimura | |
| 5,777,858 A | 7/1998 | Rodulfo | |
| 5,780,092 A | 7/1998 | Agbo et al. | |
| 5,798,631 A | 8/1998 | Spee et al. | |
| 5,801,519 A | 9/1998 | Midya et al. | |
| 5,804,894 A | 9/1998 | Leeson et al. | |
| 5,821,734 A | 10/1998 | Faulk | |
| 5,822,186 A | 10/1998 | Bull et al. | |
| 5,838,148 A | 11/1998 | Kurokami et al. | |
| 5,869,956 A | 2/1999 | Nagao et al. | |
| 5,873,738 A | 2/1999 | Shimada et al. | |
| 5,886,882 A | 3/1999 | Rodulfo | |
| 5,886,890 A | 3/1999 | Ishida et al. | |
| 5,892,354 A | 4/1999 | Nagao et al. | |
| 5,905,645 A | 5/1999 | Cross | |
| 5,917,722 A | 6/1999 | Singh | |
| 5,919,314 A | 7/1999 | Kim | |
| 5,923,158 A | 7/1999 | Kurokami et al. | |
| 5,930,128 A * | 7/1999 | Dent | 363/43 |
| 5,932,994 A | 8/1999 | Jo et al. | |
| 5,933,327 A | 8/1999 | Leighton et al. | |
| 5,945,806 A | 8/1999 | Faulk | |
| 5,949,668 A | 9/1999 | Schweighofer | |
| 5,963,010 A | 10/1999 | Hayashi et al. | |
| 5,990,659 A | 11/1999 | Frannhagen | |
| 6,002,290 A | 12/1999 | Avery et al. | |
| 6,031,736 A | 2/2000 | Takehara et al. | |
| 6,037,720 A | 3/2000 | Wong et al. | |
| 6,038,148 A | 3/2000 | Farrington et al. | |
| 6,046,919 A | 4/2000 | Madenokouji et al. | |
| 6,050,779 A | 4/2000 | Nagao et al. | |
| 6,078,511 A | 6/2000 | Fasullo et al. | |
| 6,081,104 A | 6/2000 | Kern | |
| 6,082,122 A | 7/2000 | Madenokouji et al. | |
| 6,087,738 A * | 7/2000 | Hammond | 307/17 |
| 6,105,317 A | 8/2000 | Tomiuchi et al. | |
| 6,111,188 A | 8/2000 | Kurokami et al. | |
| 6,111,391 A | 8/2000 | Cullen | |
| 6,111,767 A | 8/2000 | Handleman | |
| 6,163,086 A | 12/2000 | Choo | |
| 6,166,455 A | 12/2000 | Li | |
| 6,166,527 A | 12/2000 | Dwelley et al. | |
| 6,169,678 B1 | 1/2001 | Kondo et al. | |
| 6,219,623 B1 | 4/2001 | Wills | |
| 6,255,360 B1 | 7/2001 | Domschke et al. | |
| 6,256,234 B1 | 7/2001 | Keeth et al. | |
| 6,259,234 B1 | 7/2001 | Perol | |
| 6,262,558 B1 | 7/2001 | Weinberg | |
| 6,285,572 B1 | 9/2001 | Onizuka et al. | |
| 6,292,379 B1 | 9/2001 | Edevold et al. | |
| 6,301,128 B1 | 10/2001 | Jang et al. | |
| 6,304,065 B1 | 10/2001 | Wittenbreder | |
| 6,320,769 B2 | 11/2001 | Kurokami et al. | |
| 6,339,538 B1 | 1/2002 | Handleman | |
| 6,351,130 B1 | 2/2002 | Preiser et al. | |
| 6,369,462 B1 | 4/2002 | Siri | |
| 6,380,719 B2 | 4/2002 | Underwood et al. | |
| 6,396,170 B1 | 5/2002 | Laufenberg et al. | |
| 6,433,522 B1 | 8/2002 | Siri | |
| 6,441,597 B1 | 8/2002 | Lethellier | |
| 6,448,489 B2 | 9/2002 | Kimura et al. | |
| 6,452,814 B1 | 9/2002 | Wittenbreder | |
| 6,483,203 B1 * | 11/2002 | McCormack | 307/17 |
| 6,493,246 B2 | 12/2002 | Suzui et al. | |
| 6,507,176 B2 | 1/2003 | Wittenbreder, Jr. | |
| 6,531,848 B1 | 3/2003 | Chitsazan et al. | |
| 6,545,211 B1 | 4/2003 | Mimura | |
| 6,548,205 B2 | 4/2003 | Leung et al. | |
| 6,587,051 B2 | 7/2003 | Takehara et al. | |
| 6,590,793 B1 | 7/2003 | Nagao et al. | |
| 6,593,521 B2 | 7/2003 | Kobayashi | |
| 6,608,468 B2 | 8/2003 | Nagase | |
| 6,611,130 B2 | 8/2003 | Chang | |
| 6,611,441 B2 | 8/2003 | Kurokami et al. | |
| 6,628,011 B2 | 9/2003 | Droppo et al. | |
| 6,633,824 B2 | 10/2003 | Dollar, II | |
| 6,650,031 B1 | 11/2003 | Goldack | |
| 6,650,560 B2 | 11/2003 | MacDonald et al. | |
| 6,653,549 B2 | 11/2003 | Matsushita et al. | |
| 6,672,018 B2 | 1/2004 | Shingleton | |
| 6,678,174 B2 | 1/2004 | Suzui et al. | |
| 6,690,590 B2 | 2/2004 | Stamenic et al. | |
| 6,693,781 B1 | 2/2004 | Kroker | |
| 6,731,136 B2 | 5/2004 | Knee | |
| 6,738,692 B2 | 5/2004 | Schienbein et al. | |
| 6,744,643 B2 | 6/2004 | Luo et al. | |
| 6,765,315 B2 | 7/2004 | Hammerstrom et al. | |
| 6,768,047 B2 | 7/2004 | Chang et al. | |
| 6,788,033 B2 | 9/2004 | Vinciarelli | |
| 6,788,146 B2 | 9/2004 | Forejt et al. | |
| 6,795,318 B2 | 9/2004 | Haas et al. | |
| 6,801,442 B2 | 10/2004 | Suzui et al. | |
| 6,850,074 B2 | 2/2005 | Adams et al. | |
| 6,882,131 B1 | 4/2005 | Takada et al. | |
| 6,914,418 B2 | 7/2005 | Sung | |
| 6,919,714 B2 | 7/2005 | Delepaut | |
| 6,927,955 B2 | 8/2005 | Suzui et al. | |
| 6,933,627 B2 | 8/2005 | Wilhelm | |

(56) References Cited

U.S. PATENT DOCUMENTS

| | | |
|---|---|---|
| 6,936,995 B2 | 8/2005 | Kapsokavathis et al. |
| 6,950,323 B2 | 9/2005 | Achleitner et al. |
| 6,963,147 B2 | 11/2005 | Kurokami et al. |
| 6,984,967 B2 | 1/2006 | Notman |
| 6,984,970 B2 | 1/2006 | Capel |
| 7,030,597 B2 | 4/2006 | Bruno et al. |
| 7,031,176 B2 | 4/2006 | Kotsopoulos et al. |
| 7,042,195 B2 | 5/2006 | Tsunetsugu et al. |
| 7,046,531 B2 | 5/2006 | Zocchi et al. |
| 7,053,506 B2 | 5/2006 | Alonso et al. |
| 7,072,194 B2 | 7/2006 | Nayar et al. |
| 7,079,406 B2 | 7/2006 | Kurokami et al. |
| 7,087,332 B2 | 8/2006 | Harris |
| 7,090,509 B1 | 8/2006 | Gilliland et al. |
| 7,091,707 B2 | 8/2006 | Cutler |
| 7,097,516 B2 | 8/2006 | Werner et al. |
| 7,126,053 B2 | 10/2006 | Kurokami et al. |
| 7,126,294 B2 | 10/2006 | Minami et al. |
| 7,138,786 B2 | 11/2006 | Ishigaki et al. |
| 7,148,669 B2 | 12/2006 | Maksimovic et al. |
| 7,158,359 B2 | 1/2007 | Bertele et al. |
| 7,158,395 B2 | 1/2007 | Deng et al. |
| 7,174,973 B1 | 2/2007 | Lysaght |
| 7,193,872 B2 | 3/2007 | Siri |
| 7,218,541 B2 | 5/2007 | Price et al. |
| 7,248,946 B2 | 7/2007 | Bashaw et al. |
| 7,256,566 B2 | 8/2007 | Bhavaraju et al. |
| 7,277,304 B2 | 10/2007 | Stancu et al. |
| 7,281,141 B2 | 10/2007 | Elkayam et al. |
| 7,282,814 B2 | 10/2007 | Jacobs |
| 7,291,036 B1 | 11/2007 | Daily et al. |
| RE39,976 E | 1/2008 | Schiff et al. |
| 7,336,056 B1 | 2/2008 | Dening et al. |
| 7,348,802 B2 | 3/2008 | Kasanyal et al. |
| 7,352,154 B2 | 4/2008 | Cook |
| 7,371,963 B2 | 5/2008 | Suenaga et al. |
| 7,372,712 B2 | 5/2008 | Stancu et al. |
| 7,385,380 B2 | 6/2008 | Ishigaki et al. |
| 7,385,833 B2 | 6/2008 | Keung |
| 7,394,237 B2 | 7/2008 | Chou et al. |
| 7,420,815 B2 | 9/2008 | Love |
| 7,435,134 B2 | 10/2008 | Lenox |
| 7,435,897 B2 | 10/2008 | Russell |
| 7,471,014 B2 * | 12/2008 | Lum et al. .................. 307/83 |
| 7,495,419 B1 | 2/2009 | Ju |
| 7,504,811 B2 | 3/2009 | Watanabe et al. |
| 7,589,437 B2 | 9/2009 | Henne et al. |
| 7,600,349 B2 | 10/2009 | Liebendorfer |
| 7,602,080 B1 | 10/2009 | Hadar et al. |
| 7,605,498 B2 | 10/2009 | Ledenev et al. |
| 7,612,283 B2 | 11/2009 | Toyomura et al. |
| 7,646,116 B2 | 1/2010 | Batarseh et al. |
| 7,719,140 B2 | 5/2010 | Ledenev et al. |
| 7,748,175 B2 | 7/2010 | Liebendorfer |
| 7,759,575 B2 | 7/2010 | Jones et al. |
| 7,763,807 B2 | 7/2010 | Richter |
| 7,780,472 B2 | 8/2010 | Lenox |
| 7,782,031 B2 | 8/2010 | Qiu et al. |
| 7,783,389 B2 | 8/2010 | Yamada et al. |
| 7,787,273 B2 * | 8/2010 | Lu et al. .................. 363/133 |
| 7,804,282 B2 | 9/2010 | Bertele |
| 7,812,701 B2 * | 10/2010 | Lee et al. .................. 336/200 |
| 7,839,022 B2 | 11/2010 | Wolfs |
| 7,843,085 B2 | 11/2010 | Ledenev et al. |
| 7,864,497 B2 | 1/2011 | Quardt et al. |
| 7,868,599 B2 | 1/2011 | Rahman et al. |
| 7,880,334 B2 | 2/2011 | Evans et al. |
| 7,893,346 B2 | 2/2011 | Nachamkin et al. |
| 7,900,361 B2 | 3/2011 | Adest et al. |
| 7,919,952 B1 | 4/2011 | Fahrenbruch |
| 7,919,953 B2 | 4/2011 | Porter et al. |
| 7,925,552 B2 | 4/2011 | Tarbell et al. |
| 7,944,191 B2 | 5/2011 | Xu |
| 7,948,221 B2 | 5/2011 | Watanabe et al. |
| 7,952,897 B2 | 5/2011 | Nocentini et al. |
| 7,960,650 B2 | 6/2011 | Richter et al. |
| 7,960,950 B2 | 6/2011 | Glovinsky |
| 8,003,885 B2 | 8/2011 | Richter et al. |
| 8,004,116 B2 | 8/2011 | Ledenev et al. |
| 8,004,117 B2 | 8/2011 | Adest et al. |
| 8,013,472 B2 | 9/2011 | Adest et al. |
| 8,058,747 B2 | 11/2011 | Avrutsky et al. |
| 8,058,752 B2 | 11/2011 | Erickson, Jr. et al. |
| 8,077,437 B2 | 12/2011 | Mumtaz et al. |
| 8,093,756 B2 | 1/2012 | Porter et al. |
| 8,093,757 B2 | 1/2012 | Wolfs |
| 8,098,055 B2 | 1/2012 | Avrutsky et al. |
| 8,102,144 B2 | 1/2012 | Capp et al. |
| 8,111,052 B2 | 2/2012 | Glovinsky |
| 8,116,103 B2 | 2/2012 | Zacharias et al. |
| 8,138,914 B2 | 3/2012 | Wong et al. |
| 8,204,709 B2 | 6/2012 | Presher, Jr. et al. |
| 8,289,742 B2 | 10/2012 | Adest et al. |
| 8,415,937 B2 | 4/2013 | Hester |
| 8,436,592 B2 | 5/2013 | Saitoh |
| 8,570,017 B2 | 10/2013 | Perichon et al. |
| 2001/0023703 A1 | 9/2001 | Kondo et al. |
| 2001/0034982 A1 | 11/2001 | Nagao et al. |
| 2002/0044473 A1 | 4/2002 | Toyomura et al. |
| 2002/0056089 A1 | 5/2002 | Houston |
| 2003/0058593 A1 | 3/2003 | Bertele et al. |
| 2003/0058662 A1 | 3/2003 | Baudelot et al. |
| 2003/0066076 A1 | 4/2003 | Minahan |
| 2003/0075211 A1 | 4/2003 | Makita et al. |
| 2003/0080741 A1 | 5/2003 | LeRow et al. |
| 2003/0214274 A1 | 11/2003 | Lethellier |
| 2004/0004402 A1 * | 1/2004 | Kippley .................. 307/82 |
| 2004/0041548 A1 | 3/2004 | Perry |
| 2004/0061527 A1 | 4/2004 | Knee |
| 2004/0125618 A1 | 7/2004 | De Rooij |
| 2004/0140719 A1 | 7/2004 | Vulih et al. |
| 2004/0169499 A1 | 9/2004 | Huang et al. |
| 2004/0201279 A1 | 10/2004 | Templeton |
| 2004/0201933 A1 | 10/2004 | Blanc |
| 2004/0246226 A1 | 12/2004 | Moon |
| 2005/0002214 A1 | 1/2005 | Deng et al. |
| 2005/0005785 A1 | 1/2005 | Poss et al. |
| 2005/0017697 A1 | 1/2005 | Capel |
| 2005/0057214 A1 | 3/2005 | Matan |
| 2005/0057215 A1 | 3/2005 | Matan |
| 2005/0068820 A1 | 3/2005 | Radosevich et al. |
| 2005/0099138 A1 | 5/2005 | Wilhelm |
| 2005/0103376 A1 | 5/2005 | Matsushita et al. |
| 2005/0105224 A1 | 5/2005 | Nishi |
| 2005/0121067 A1 | 6/2005 | Toyomura et al. |
| 2005/0162018 A1 | 7/2005 | Realmuto et al. |
| 2005/0172995 A1 | 8/2005 | Rohrig et al. |
| 2005/0226017 A1 | 10/2005 | Kotsopoulos et al. |
| 2005/0281064 A1 | 12/2005 | Olsen et al. |
| 2006/0001406 A1 | 1/2006 | Matan |
| 2006/0017327 A1 | 1/2006 | Siri et al. |
| 2006/0034106 A1 | 2/2006 | Johnson |
| 2006/0038692 A1 | 2/2006 | Schnetker |
| 2006/0053447 A1 | 3/2006 | Krzyzanowski et al. |
| 2006/0066349 A1 | 3/2006 | Murakami |
| 2006/0068239 A1 | 3/2006 | Norimatsu et al. |
| 2006/0108979 A1 | 5/2006 | Daniel et al. |
| 2006/0113843 A1 | 6/2006 | Beveridge |
| 2006/0113979 A1 | 6/2006 | Ishigaki et al. |
| 2006/0118162 A1 | 6/2006 | Saelzer et al. |
| 2006/0132102 A1 | 6/2006 | Harvey |
| 2006/0149396 A1 | 7/2006 | Templeton |
| 2006/0162772 A1 | 7/2006 | Presher, Jr. et al. |
| 2006/0163946 A1 | 7/2006 | Henne et al. |
| 2006/0171182 A1 | 8/2006 | Siri et al. |
| 2006/0174939 A1 | 8/2006 | Matan |
| 2006/0176716 A1 | 8/2006 | Balakrishnan et al. |
| 2006/0185727 A1 | 8/2006 | Matan |
| 2006/0192540 A1 | 8/2006 | Balakrishnan et al. |
| 2006/0208660 A1 | 9/2006 | Shinmura et al. |
| 2006/0227578 A1 | 10/2006 | Datta et al. |
| 2006/0237058 A1 | 10/2006 | McClintock et al. |
| 2007/0013349 A1 | 1/2007 | Bassett |
| 2007/0030068 A1 | 2/2007 | Motonobu et al. |

(56) References Cited

U.S. PATENT DOCUMENTS

| | | |
|---|---|---|
| 2007/0044837 A1 | 3/2007 | Simburger et al. |
| 2007/0075689 A1 | 4/2007 | Kinder et al. |
| 2007/0075711 A1 | 4/2007 | Blanc et al. |
| 2007/0081364 A1 | 4/2007 | Andreycak |
| 2007/0147075 A1 | 6/2007 | Bang |
| 2007/0159866 A1 | 7/2007 | Siri |
| 2007/0164612 A1 | 7/2007 | Wendt et al. |
| 2007/0164750 A1 | 7/2007 | Chen et al. |
| 2007/0165347 A1 | 7/2007 | Wendt et al. |
| 2007/0205778 A1 | 9/2007 | Fabbro et al. |
| 2007/0227574 A1 | 10/2007 | Cart |
| 2007/0236187 A1 | 10/2007 | Wai et al. |
| 2007/0247877 A1 | 10/2007 | Kwon et al. |
| 2007/0273342 A1 | 11/2007 | Kataoka et al. |
| 2007/0290636 A1 | 12/2007 | Beck et al. |
| 2008/0024098 A1 | 1/2008 | Hojo |
| 2008/0080177 A1 | 4/2008 | Chang |
| 2008/0088184 A1 | 4/2008 | Tung et al. |
| 2008/0097655 A1 | 4/2008 | Hadar et al. |
| 2008/0106250 A1 | 5/2008 | Prior et al. |
| 2008/0115823 A1 | 5/2008 | Kinsey |
| 2008/0136367 A1 | 6/2008 | Adest et al. |
| 2008/0143188 A1 | 6/2008 | Adest et al. |
| 2008/0143462 A1 | 6/2008 | Belisle et al. |
| 2008/0144294 A1 | 6/2008 | Adest et al. |
| 2008/0147335 A1 | 6/2008 | Adest et al. |
| 2008/0150366 A1 | 6/2008 | Adest et al. |
| 2008/0164766 A1 | 7/2008 | Adest et al. |
| 2008/0179949 A1 | 7/2008 | Besser et al. |
| 2008/0218152 A1 | 9/2008 | Bo |
| 2008/0236647 A1 | 10/2008 | Gibson et al. |
| 2008/0236648 A1 | 10/2008 | Klein et al. |
| 2008/0238195 A1 | 10/2008 | Shaver et al. |
| 2008/0246460 A1 | 10/2008 | Smith |
| 2008/0246463 A1 | 10/2008 | Sinton et al. |
| 2008/0252273 A1 | 10/2008 | Woo et al. |
| 2008/0303503 A1 | 12/2008 | Wolfs |
| 2009/0039852 A1 | 2/2009 | Fishelov et al. |
| 2009/0066399 A1 | 3/2009 | Chen et al. |
| 2009/0073726 A1 | 3/2009 | Babcock |
| 2009/0084570 A1 | 4/2009 | Gherardini et al. |
| 2009/0097172 A1 | 4/2009 | Bremicker et al. |
| 2009/0102440 A1 | 4/2009 | Coles |
| 2009/0140715 A1 | 6/2009 | Adest et al. |
| 2009/0141522 A1 | 6/2009 | Adest et al. |
| 2009/0145480 A1 | 6/2009 | Adest et al. |
| 2009/0146667 A1 | 6/2009 | Adest et al. |
| 2009/0146671 A1 | 6/2009 | Gazit |
| 2009/0147554 A1 | 6/2009 | Adest et al. |
| 2009/0184746 A1 | 7/2009 | Fahrenbruch |
| 2009/0190275 A1 | 7/2009 | Gilmore et al. |
| 2009/0206666 A1 | 8/2009 | Sella et al. |
| 2009/0217965 A1 | 9/2009 | Dougal et al. |
| 2009/0224817 A1 | 9/2009 | Nakamura et al. |
| 2009/0237042 A1 | 9/2009 | Glovinski |
| 2009/0237043 A1 | 9/2009 | Glovinsky |
| 2009/0242011 A1 | 10/2009 | Proisy et al. |
| 2009/0282755 A1 | 11/2009 | Abbott et al. |
| 2009/0284998 A1 | 11/2009 | Zhang et al. |
| 2009/0322494 A1 | 12/2009 | Lee |
| 2010/0001587 A1 | 1/2010 | Casey et al. |
| 2010/0052735 A1 | 3/2010 | Burkland et al. |
| 2010/0085670 A1 | 4/2010 | Palaniswami et al. |
| 2010/0124027 A1 | 5/2010 | Handelsman et al. |
| 2010/0127571 A1 | 5/2010 | Hadar et al. |
| 2010/0139743 A1 | 6/2010 | Hadar et al. |
| 2010/0176773 A1 | 7/2010 | Capel |
| 2010/0181957 A1 | 7/2010 | Goeltner |
| 2010/0214808 A1 | 8/2010 | Rodriguez |
| 2010/0244575 A1 | 9/2010 | Coccia et al. |
| 2010/0269430 A1 | 10/2010 | Haddock |
| 2010/0277001 A1 | 11/2010 | Wagoner |
| 2010/0282290 A1 | 11/2010 | Schwarze et al. |
| 2010/0301991 A1 | 12/2010 | Sella et al. |
| 2010/0308662 A1 | 12/2010 | Schatz et al. |
| 2011/0006743 A1 | 1/2011 | Fabbro |
| 2011/0037600 A1 | 2/2011 | Takehara et al. |
| 2011/0043172 A1 | 2/2011 | Dearn |
| 2011/0056533 A1 | 3/2011 | Kuan |
| 2011/0079263 A1 | 4/2011 | Avrutsky |
| 2011/0084553 A1 | 4/2011 | Adest et al. |
| 2011/0114154 A1 | 5/2011 | Lichy et al. |
| 2011/0121652 A1 | 5/2011 | Sella et al. |
| 2011/0125431 A1 | 5/2011 | Adest et al. |
| 2011/0140536 A1 | 6/2011 | Adest et al. |
| 2011/0181251 A1 | 7/2011 | Porter et al. |
| 2011/0210611 A1 | 9/2011 | Ledenev et al. |
| 2011/0254372 A1 | 10/2011 | Haines et al. |
| 2011/0260866 A1 | 10/2011 | Avrutsky et al. |
| 2011/0267859 A1 | 11/2011 | Chapman |
| 2011/0271611 A1 | 11/2011 | Maracci et al. |
| 2011/0273015 A1 | 11/2011 | Adest et al. |
| 2011/0273016 A1 | 11/2011 | Adest et al. |
| 2011/0285205 A1 | 11/2011 | Ledenev et al. |
| 2011/0290317 A1 | 12/2011 | Naumovitz et al. |
| 2011/0291486 A1 | 12/2011 | Adest et al. |
| 2011/0316346 A1 | 12/2011 | Porter et al. |
| 2012/0007613 A1 | 1/2012 | Gazit |
| 2012/0019966 A1 | 1/2012 | Deboer |
| 2012/0032515 A1 | 2/2012 | Ledenev et al. |
| 2012/0081009 A1 | 4/2012 | Shteynberg et al. |
| 2012/0091810 A1 | 4/2012 | Aiello et al. |

FOREIGN PATENT DOCUMENTS

| | | |
|---|---|---|
| CN | 101488271 A | 7/2009 |
| CN | 101523230 A | 9/2009 |
| DE | 19737286 | 3/1999 |
| DE | 102005030907 | 1/2007 |
| DE | 102008057874 | 5/2010 |
| EP | 0419093 | 3/1991 |
| EP | 0420295 | 4/1991 |
| EP | 0604777 | 7/1994 |
| EP | 0756178 | 1/1997 |
| EP | 0827254 | 3/1998 |
| EP | 1039621 A2 | 9/2000 |
| EP | 1 330 009 A | 7/2003 |
| EP | 1503490 | 2/2005 |
| EP | 1531542 A2 | 5/2005 |
| EP | 1531545 | 5/2005 |
| EP | 1657557 | 5/2006 |
| EP | 1657797 | 5/2006 |
| EP | 1887675 | 2/2008 |
| EP | 2048679 | 4/2010 |
| EP | 2315328 A2 | 4/2011 |
| EP | 2393178 A2 | 12/2011 |
| ES | 2249147 | 3/2006 |
| ES | 2249149 | 3/2006 |
| GB | 2476508 A | 6/2011 |
| JP | 61065320 | 4/1986 |
| JP | 6165320 | 5/1986 |
| JP | 8009557 A | 1/1996 |
| JP | 11041832 | 2/1999 |
| JP | 11103538 | 4/1999 |
| JP | 11206038 A | 7/1999 |
| JP | 11289891 A | 10/1999 |
| JP | 11318042 A | 11/1999 |
| JP | 2000339044 A | 12/2000 |
| JP | 2002300735 A | 10/2002 |
| JP | 2003124492 | 4/2003 |
| JP | 2003134667 | 5/2003 |
| JP | 2004194500 A | 7/2004 |
| JP | 2004260944 A | 9/2004 |
| JP | 2004334704 A | 11/2004 |
| JP | 2005192314 A | 7/2005 |
| JP | 2007058845 | 3/2007 |
| WO | 9313587 | 7/1993 |
| WO | 9613093 | 5/1996 |
| WO | 9823021 | 5/1998 |
| WO | 00/00839 | 1/2000 |
| WO | 0021178 | 4/2000 |
| WO | 0075947 | 12/2000 |
| WO | 0231517 | 4/2002 |
| WO | 2003050938 | 6/2003 |

(56) References Cited

FOREIGN PATENT DOCUMENTS

| WO | 2003071655 | | 8/2003 |
|---|---|---|---|
| WO | 2004023278 | | 3/2004 |
| WO | 2004090993 | | 10/2004 |
| WO | 2004107543 | | 12/2004 |
| WO | 2005076444 | | 8/2005 |
| WO | 2005076445 | A | 8/2005 |
| WO | 2006005125 | | 1/2006 |
| WO | 2006007198 | | 1/2006 |
| WO | 2006078685 | | 7/2006 |
| WO | 2007006564 | | 1/2007 |
| WO | 2007048421 | | 5/2007 |
| WO | 2007073951 | | 7/2007 |
| WO | 2007084196 | | 7/2007 |
| WO | 2007090476 | | 8/2007 |
| WO | 2007113358 | | 10/2007 |
| WO | 2008008528 | A2 | 1/2008 |
| WO | 2008125915 | | 10/2008 |
| WO | 2008132551 | | 11/2008 |
| WO | 2008132553 | | 11/2008 |
| WO | 2008142480 | | 11/2008 |
| WO | 2009007782 | | 1/2009 |
| WO | 2009046533 | A1 | 4/2009 |
| WO | 2009051853 | | 4/2009 |
| WO | 2009118682 | | 10/2009 |
| WO | 2009118683 | | 10/2009 |
| WO | 2009136358 | | 11/2009 |
| WO | 2010/002960 | A1 | 1/2010 |
| WO | 2010065388 | | 6/2010 |
| WO | 2010072717 | | 7/2010 |
| WO | 2010078303 | A2 | 7/2010 |
| WO | 2010094012 | A1 | 8/2010 |
| WO | 2011011711 | | 1/2011 |
| WO | 2011017721 | | 2/2011 |
| WO | 2011023732 | A2 | 3/2011 |
| WO | 2011059067 | A1 | 5/2011 |
| WO | 2011074025 | A1 | 6/2011 |

OTHER PUBLICATIONS

International Search Report and Opinion of International Patent application WO2009136358, Sep. 16, 2009.
Geoffrey R. Walker Affidavit re: U.S. Appl. No. 11/950,307, submitted in an IDS for U.S. Appl. No. 11/950,271 on Mar. 9, 2010.
Geoffrey R. Walker Affidavit re: U.S. Appl. No. 11/950,271, submitted in an IDS for U.S. Appl. No. 11/950,271 on Mar. 9, 2010.
QT Technical Application Papers, "ABB Circuit-Breakers for Direct current Applications", ABB SACE S.p. A., an ABB Group Coupany, L.V. Breakers, Via Baioni, 35, 24123 Bergamo-Italy, Tel.: +39 035. 395.111 - Telefax: +39 035.395.306-433, Sep. 2007.
Extended European Search Report—EP12176089.6—Mailing date: Nov. 8, 2012.
Gwon-Jong Yu et al: "Maximum power point tracking with temperature compensation of photovoltaic for air conditioning system with fuzzy controller", 19960513; 19960513 - 19960517, May 13, 1996 ( 1996-05-13), pp. 1429-1432, XP010208423.
Extended European Search Report—EP12177067.1—Mailing Date: Dec. 7, 2012.
GB Combined Search and Examination Report—GB1200423.0—Mailing date: Apr. 30, 2012.
GB Combined Search and Examination Report—GB1201499.9—Mailing date: May 28, 2012.
GB Combined Search and Examination Report—GB1201506.1—Mailing date: May 22, 2012.
Ciobotaru, et al., Control of single-stage single-phase PV inverter, Aug. 7, 2006.
International Search Report and Written Opinion for PCT/IB2007/004591 dated Jul. 5, 2010.
European Communication for EP07873361.5 dated Jul. 12, 2010.
European Communication for EP07874022.2 dated Oct. 18, 2010.
European Communication for EP07875148.4 dated Oct. 18, 2010.
Chen, et al., "A New Low-Stress Buck-Boost Converter for Universal-Input PFC Applications", IEEE Applied Power Electronics Converence, Feb. 2001, Colorado Power Electronics Center Publications.
Chen, et al., "Buck-Boost PWM Converters Having Two Independently Controlled Switches", IEEE Power Electronics Specialists Converence, Jun. 2001, Colorado Power Electronics Center Publications.
Esram, et al., "Comparison of Photovoltaic Array Maximum Power Point Tracking Techniques", IEEE Transactions on Energy Conversion, vol. 22, No. 2, Jun. 2007, pp. 439-449.
Walker, et al., "PhotoVoltaic DC-DC Module Integrated Converter for Novel Cascaded and Bypass Grid Connection Topologies-Design and Optimisation", 37th IEEE Power Electronics Specialists Converence, Jun. 18-22, 2006, Jeju, Korea.
Geoffrey R. Walker Affidavit re: U.S. Appl. No. 11/950,307.
Geoffrey R. Walker Affidavit re: U.S. Appl. No. 11/950,271.
International Search Report for PCT/IB2007/004610 dated Feb. 23, 2009.
International Search Report for PCT/IB2007/004584 dated Jan. 28, 2009.
International Search Report for PCT/IB2007/004586 dated Mar. 5, 2009.
International Search Report for PCT/IB2007/004643 dated Jan. 30, 2009.
International Search Report for PCT/US2008/085736 dated Jan. 28, 2009.
International Search Report for PCT/US2008/085754 dated Feb. 9, 2009.
International Search Report for PCT/US2008/085755 dated Feb. 3, 2009.
Kajihara, et al., "Model of Photovoltaic Cell Circuits Under Partial Shading", 2005 IEEE, pp. 866-870.
Knaupp, et al., "Operation of a 10 KW PV Façade with 100 W AC Photovoltaic Modules", 1996 IEEE, 25th PVSC, May 13-17, 1996, pp. 1235-1238, Washington, DC.
Alonso, et al., "Cascaded H-Bridge Multilevel Converter for Grid Connected Photovoltaic Generators with Independent Maximum Power Point Tracking of Each Solor Array", 2003 IEEE 34th, Annual Power Electronics Specialists Conference, Acapulco, Mexico, Jun. 15-19, 2003, pp. 731-735, vol. 2.
Myrzik, et al., "String and Module Integrated Inverters for Single-Phase Grid Connected Photovoltaic Systems—A Review", Power Tech Conference Proceedings, 2003 IEEE Bologna, Jun. 23-26, 2003, p. 8, vol. 2.
Chen, et al., "Predictive Digital Current Programmed Control", IEEE Transactions on Power Electronics, vol. 18, Issue 1, Jan. 2003.
Wallace, et al., "DSP Controlled Buck/Boost Power Factor Correction for Telephony Rectifiers", Telecommunications Energy Conference 2001, INTELEC 2001, Twenty-Third International, Oct. 18, 2001, pp. 132-138.
Alonso, "A New Distributed Converter Interface for PV Panels", 20th European Photovoltaic Solar Energy Conference, Jun. 6-10, 2005, Barcelona, Spain, pp. 2288-2291.
Alonso, "Experimental Results of Intelligent PV Module for Grid-Connected PV Systems", 21st European Photovoltaic Solar Energy Conference, Sep. 4-8, 2006, Dresden, Germany, pp. 2297-2300.
Enslin, "Integrated Photovoltaic Maximum Power Point Tracking Converter", IEEE Transactions on Industrial Electronics, vol. 44, No. 6, Dec. 1997, pp. 769-773.
Lindgren, "Topology for Decentralised Solar Energy Inverters with a Low Voltage AC-Bus", Chalmers University of Technology, Department of Electrical Power Engineering, EPE '99—Lausanne.
Nikraz, "Digital Control of a Voltage Source Inverter in a Photovoltaic Applications", 2004 35th Annual IEEE Power Electronics Specialists Conference, Aachen, Germany, 2004, pp. 3266-3271.
Orduz, "Evaluation Test Results of a New Distributed MPPT Converter", 22nd European Photovoltaic Solar Energy Conference, Sep. 3-7, 2007, Milan, Italy.
Palma, "A Modular Fuel Cell, Modular DC-DC Converter Concept for High Performance and Enhanced Reliability", IEEE 2007, pp. 2633-2638.
Quaschning, "Cost Effectiveness of Shadow Tolerant Photovoltaic Systems", Berlin University of Technology, Institute of Electrical Energy Technology, Renewable Energy Section. EuroSun '96, pp. 819-824.

(56) References Cited

OTHER PUBLICATIONS

Roman, "Intelligent PV Module for Grid-Connected PV Systems", IEEE Transactions on Industrial Electronics, vol. 52, No. 4, Aug. 2006, pp. 1066-1073.
Roman, "Power Line Communications in Modular PV Systems", 20th European Photovoltaic Solar Energy Conference, Jun. 6-10, 2005, Barcelona, Spain, pp. 2249-2252.
Uriarte, "Energy Integrated Management System for PV Applications", 20th European Photovoltaic Solar Energy Conference, Jun. 6-10, 2005, Barcelona, Spain, pp. 2292-2295.
Walker, "Cascaded DC-DC Converter Connection of Photovoltaic Modules", IEEE Transactions on Power Electronics, vol. 19, No. 4, Jul. 2004, pp. 1130-1139.
Matsui, et al. "A New Maximum Photovoltaic Power Tracking Control Scheme Based on Power Equilibrium at DC Link", IEEE, 1999, pp. 804-809.
International Preliminary Report on Patentability for PCT/IB2008/055092 dated Jun. 8, 2010.
International Search Report for PCT/IB2008/055092 dated Sep. 8, 2009.
PCT/IB2010/052287 International Search Report and Written Opinion dated Sep. 2, 2010.
UK Intellectual Property office, Combined Search and Examination Report for GB1100450.4 under Sections 17 and 18 (3), Jul. 14, 2011.
Jain, et al., "A Single-Stage Grid Connected Inverter Topology for Solar Pv Systems with Maximum Power Point Tracking", IEEE Transactions on Power Electronics, vol. 22, No. 5, Sep. 2007, pp. 1928-1940.
Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.
Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.
Sandia Report SAND96-2797 I UC-1290 Unlimited Release, Printed Dec. 1996, "Photovoltaic Power Systems and the National Electrical Code: Suggested Practices", by John Wiles, Southwest Technology Development Instutte New Mexico State University Las Cruces, NM.
United Kingdom Intellectual Property Office, Combined Search and Examination Report Under Sections 17 and 18(3), GB1020862.7, dated Jun. 16, 2011.
QT Technical Application Papers, "ABB Circuit-Breakers for Direct current Applications", ABB SACE S.p. A., an ABB Group Coupany, L.V. Breakers, Via Baioni, 35, 24123 Bergamo-Italy, Tel.: ⇆035.395.111 - Telefax: ⇆035.395.306-433.
Woyte, et al., "Mains Monitoring and Protection in a European Context", 17th European Photovoltaic Solar Energy Conference and Exhibition, Munich, Germany, Oct. 22-26, 2001, Achim, Woyte, et al., pp. 1-4.
"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth IEEE, May 19-24, 2002.
Fairchild Semiconductor, Application Note 9016, IGBT Basics 1, by K.S. Oh Feb. 1, 2001.
"Study of Energy Storage Capacitor Reduction for Single Phase PWM Rectifier", Ruxi Wang et al., Virginia Polytechnic Institute and State University, Feb. 2009.
"Multilevel Inverters: A Survey of Topologies, Controls, and Applications", Jose Rodriguez et al., IEEE Transactions on Industrial Electronics, vol. 49, No. 4, August 2002.
Extended European Search Report—EP 08878650.4—Mailing date: Mar. 28, 2013.
Satcon Solstice—Satcon Solstice 100 kW System Solution Sheet—2010.
John Xue, "PV Module Series String Balancing Converters", University of Queensland—School of Infroanrition Technology & Electrical Engineering, Nov. 6, 2002.
Robert W Erickson, "Future of Power Electronics for Photovoltaics", IEEE Applied Power Electronics Conference, Feb. 2009.
Mohammad Reza Amini et al., "Quasi REsonant Dc Link Inverter with a Simple Auxiliary Circuit", Journal of Power Electronics, vol. 11, No. 1, Jan. 2011.
Khairy Fathy et al., "A Novel Quasi-Resonant Snubber-Assisted ZCS-PWM DC-DC Converter with High Frequency Link", Journal of Power Electronics, vol. 7, No. 2, Apr. 2007.
Cheng K.W.E., "New Generation of Switched Capacitor Converters", Department of Electrical Engineering, the Hong Kong Polytechnic University, Hung Hom, Hong Kong, Power Electronics Conference, 1998, PESC 98.
Per Karlsson, "Quasi Resonant DC Link Converters —Analysis and Design for a Battery Charger Application", Universitetstryckeriet, Lund University, 1999, ISBN 91-88934-14-4.
Hsiao Sung-Hsin et al., "ZCS Switched-Capacitor Bidirectional Converters with Secondary Output Power Amplifier for Biomedical Applications", Power Electronics Conference (IPEC) Jun. 21, 2010.
Yuang-Shung Lee et al., "A Novel QR ZCS Switched-Capacitor Bidirectional Converter", IEEE, 2007.
Antti Tolvanen et al., "Seminar on Solar Simulation Standards and Measurement Principles", May 9, 2006 Hawaii.
J.A. Eikelboom and M.J. Jansen, "Characterisation of PV Modules of New Generations—Results of test simulations", Jun. 2000.
Yeong-Chau Kuo et al., "Novel Maximum-Power-Point-Tracking Controller for Photovoltaic Energy Conversion System", IEEE Transactions on Industrial Electronics, vol. 48, No. 3, Jun. 2001.
C. Liu et al., "Advanced Algorithm for MPPT Control of Photovoltaic Systems", Canadian Solar Buildings Conference, Montreal, Aug. 20-24, 2004.
Chihchiang Hua and Chihming Shen, "Study of Maximum Power Tracking Techniques and Control of DC/DC Converters for Photovoltaic Power System", IEEE 1998.
Tore Skjellnes et al., "Load sharing for parallel inverters without communication", Nordic Workshop in Power and Industrial Electronics, Aug. 12-14, 2002.
Giorgio Spiazzi at el., "A New Family of Zero-Current-Switching Variable Frequency dc-dc Converters", IEEE 2000.
Nayar, C.V., M. Ashari and W.W.L Keerthiphala, "A Gridinteractive Photovoltaic Uninterruptible Power Supply System Using Battery Storage and a Back up Diesel Generator", IEEE Transactions on Energy Conversion, vol. 15, No. 3, Sep. 2000, pp. 348?353.
Ph. Strauss et al., "AC coupled PV Hybrid systems and Micro Grids-state of the art and future trends", 3rd World Conference on Photovoltaic Energy Conversion, Osaka, Japan May 11-18, 2003.
Nayar, C.V., abstract, Power Engineering Society Summer Meeting, 2000. IEEE, 2000, pp. 1280-1282 vol. 2.
D. C. Martins et al., "Analysis of Utility Interactive Photovoltaic Generation System using a Single Power Static Inverter", Asian J. Energy Environ., vol. 5, Issue 2, (2004), pp. 115-137.
Rafael C. Beltrame et al., "Decentralized Multi String PV System With Integrated ZVT Cell", Congresso Brasileiro de Automatica/12 a Sep. 16, 2010, Bonito-MS.
Sergio Busquets-Monge et al., "Multilevel Diode-clamped Converter for Photovoltaic Generators With Independent Voltage Control of Each Solar Array", IEEE Transactions on Industrial Electronics, vol. 55, No. 7, July 2008.
Soeren Baekhoej Kjaer et al., "A Review of Single-Phase Grid-Connected Inverters for Photovoltaic Modules", IEEE Transactions on Industry Applications, vol. 41, No. 5, Sep./Oct. 2005.
Office Action—JP 2011-539491—Mailing date: Mar. 26, 2013.
Lijun Gao et al., Parallel-Connected Solar PV System to Address Partial and Rapidly Fluctuating Shadow Conditions, IEEE Transactions on industrial Electronics, vol. 56, No. 5, May 2009.
Walker G R: "Cascaded DC-DC converter connection of photovoltaic modules" 33RD Annual IEEE Power Electronics Specialists Conference. PESC 2002. Conference Proceedings. Cairns, Queensland, Australia, June 23-27, 2002; [Annual Power Electronics Specialists Conference], New York, NY : IEEE, US, vol. 1, Jun. 23, 2002, pp. 24-29, XP010596060 ISBN: 978-0-7803-7262-7 figure 1.

(56) References Cited

OTHER PUBLICATIONS

International Search Report and Opinion of International Patent application W02009136358, Sep. 16, 2009.
Informal Comments to the International Search Report Dec. 3, 2009.
"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU301197B0201, Nov. 2009.
Walker, "A DC Circuit Breaker for an Electric Vehicle Battery Pack", Australasian Universities Power Engineering Conference and IEAust Electric Energy Conference, Sep. 26-29, 1999.
Combined Search and Examination Report for GB1018872.0 dated Apr. 15, 2011, 2 pages.
International Search Report and Opinion of International Patent Application PCT/2009/051221, dated Oct. 19, 2009.
International Search Report and Opinion of International Patent Application PCT/2009/051222, dated Oct. 7, 2009.
Communication in EP07874025.5 dated Aug. 17, 2011.
IPRP for PCT/IB2008/055095 dated Jun. 8, 2010, with Written Opinion.
ISR for PCT/IB2008/055095 dated Apr. 30, 2009.
IPRP for PCT/IL2007/001064 dated Mar. 17, 2009, with Written Opinion dated Mar. 25, 2008.
ISR for PCT/IL07/01064 dated Mar. 25, 2008.
IPRP for PCT/IB2007/004584 dated Jun. 10, 2009, with Written Opinion.
IPRP for PCT/IB2007/004586 dated Jun. 10, 2009, with Written Opinion.
IPRP for PCT/IB2007/004591 dated Jul. 13, 2010, with Written Opinion.
IPRP for PCT/IB2007/004610 dated Jun. 10, 2009, with Written Opinion.
IPRP for PCT/IB2007/004643 dated Jun. 10, 2009, with Written Opinion.
Written Opinion for PCT/IB2008/055092 submitted with IPRP dated Jun. 8, 2010.
IPRP for PCT/US2008/085754 dated Jun. 8, 2010, with Written Opinion dated Jan. 21, 2009.
IPRP for PCT/US2008/085755 dated Jun. 8, 2010, with Written Opinion dated Jan. 20, 2009.
IPRP for PCT/IB2009/051221 dated Sep. 28, 2010, with Written Opinion.
IPRP for PCT/IB2009/051222 dated Sep. 28, 2010, with Written Opinion.
IPRP for PCT/IB2009/051831 dated Nov. 9, 2010, with Written Opinion.
IPRP for PCT/US2008/085736 dated Jun. 7, 2011, with Written Opinion.
IPRP for PCT/IB2010/052287 dated Nov. 22, with Written Opinion.
ISR for PCT/IB2010/052413 dated Sep. 7, 2010.
UK Intellectual Property Office, Application No. GB1109618.7, Patents Act 1977, Examination Report Under Section 18(3), Sep. 16, 2011, Examiner Peter Keefe.
UK Intellectual Property Office, Patents Act 1977: Patents Rules Notification of Grant: Patent Serial No. GB2480015, Nov. 29, 2011.
Walker, et al. "PV String Per-Module Maximum Power Point Enabling Converters", School of Information Technology and Electrical Engineering the University of Queensland, Sep. 28, 2003.
Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.
llic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, pp. 1619-1922.
Lee: "Novel Zero-Voltage-Transition and Zero-Current-Transition Pulse-Width-Modulation Converters", Power.Electronics Specialists Conference, 1997, PESC '97, Record, 28th Annual IEEE St. Louis, MO, USA, Jun. 22-27, 1997, New York, NY, USA IEEE, US, vol. 1, Jun. 22, 1997, pp. 233-239, XP010241553, ISBN: 978-07803-3840-1, pp. 233-236.
Sakamoto, "Switched Snubber for High-Frequency Switching Converters", Electronics & Communications in Japan. Part 1—Communications, Wiley, Hoboken, NJ, US, vol. 76, No. 2, Feb. 1, 1993, pp. 30-38, XP000403018 ISSN: 8756-6621, pp. 30-35.
Duarte, "A Family of ZVX-PWM Active-Clamping DC-to-DC Converters: Synthesis, Analysis and Experimentation", Telecommunications Energy Conference, 1995, INTELEC '95, 17th International The Hague, Netherlands, Oct. 29-Nov. 1, 1995, New York, NY, US, IEEE, US, Oct. 29, 1995, pp. 502-509, XP010161283 ISBN: 978-0-7803-2750-4 pp. 503-504.
Hou, et al., Application of Adaptive Algorithm of Solar Cell Battery Charger, Apr. 2004.
Stamenic, et al., "Maximum Power Point Tracking for Building Integrated Photovoltaic Ventilation Systems", 2000.
Extended European Search Report—EP14151651.8—Mailing date: Feb. 25, 2014.
Iyomori H et al: "Three-phase bridge power block module type auxiliary resonant AC link snubber-assisted soft switching inverter for distributed AC power supply", Intelec 2003. 25TH. International Telecommunications Energy Conference. Yokohama, Japan, Oct. 19-23, 2003; Tokyo, IEICE, JP, Oct. 23, 2003, pp. 650-656, XP031895550, ISBN: 978-4-88552-196-6.
Yuqing Tang: "High Power Inverter EMI characterization and Improvement Using Auxiliary Resonant Snubber Inverter", Dec. 17, 1998, XP055055241, Blacksburg, Virginia Retrieved from the Internet: URL:http:jjscholar.lib.vt.edu/theses/available/etd-012299-165108/unrestricted/THESIS. PDF, [retrieved on Mar. 5, 2013].
Yoshida M et al: "Actual efficiency and electromagnetic noises evaluations of a single inductor resonant AC link snubber-assisted three-phase soft-switching inverter", Intelec 2003. 25TH. International Telecommunications Energy Conference. Yokohama, Japan, Oct. 19-23, 2003; Tokyo, IEICE, JP, Oct. 23, 2003, pp. 721-726, XP031895560, ISBN: 978-4-88552-196-6.
Third party observation—EP07874025.5—Mailing date: Aug. 6, 2011.
Extended European Search Report—EP 13152967.9—Mailing date: Aug. 28, 2014.

* cited by examiner

DIRECT CURRENT POWER COMBINER

CROSS REFERENCE TO RELATED APPLICATIONS

The present applications benefits from U.S. application 61/050,268 filed on May 5, 2008 by the same inventor.

FIELD AND BACKGROUND

1. Field

The present invention relates to energy conversion and specifically to circuitry which combines multiple voltage inputs from serially connected direct current sources into a combined output.

2. Description of Related Art

Sunlight includes a spectrum of electromagnetic radiation emitted by the Sun onto the surface of the Earth. On the Earth, sunlight is filtered through the atmosphere, and the solar irradiance (Watts/meter square/nanometer W/m²/nm) is obvious as daylight when the Sun is above the horizon. The Earth receives a total solar irradiance determined by its cross section ($\pi \cdot R_E^2$, $R_E$=radius of the earth), but as the Earth rotates the solar energy is distributed across the entire surface area ($4 \cdot \pi \cdot R_E^2$). The solar constant is the amount of incoming solar electromagnetic irradiance per unit area, measured on the outer surface of Earth's atmosphere in a plane perpendicular to the solar rays. The solar constant is measured by satellite to be roughly 1366 watts per square meter (W/m²) or 1.366 W/m²/nm. Hence the average incoming solar irradiance, taking into account the angle at which the rays strike and that at any one moment half the planet does not receive any solar irradiance, is one-fourth the solar constant (approximately 0.342 W/m²/nm). At any given moment, the amount of solar irradiance received at a location on the Earth's surface depends on the state of the atmosphere and the location's latitude.

The performance of a photovoltaic cell depends on the state of the atmosphere, the latitude and the orientation of the photovoltaic cell towards the Sun and on the electrical characteristics of the photovoltaic cell.

FIG. 1 shows schematically a graph of a solar irradiance 100 versus wavelength. Irradiance 100 is distributed around a peak wavelength at about 550 nanometers. FIG. 1 also shows schematically an absorption spectrum 102 of a typical solar photovoltaic (PV) cell with a given band-gap which allows only a portion of the solar irradiance to be converted into electrical power. The finite characteristic of the band-gap of the photovoltaic cell causes a substantial part of the sun's energy to remain unutilized. In order to improve photovoltaic efficiency, multiple junction cells have been designed which include multiple pn junctions. Solar irradiance not absorbed, because its energy is less than the band gap is transmitted to the next junction(s) with a smaller band gap and the transmitted radiation is preferentially absorbed and converted into electrical energy.

FIG. 2 shows the graph of solar irradiance 100 versus wavelength and three absorption spectra 202, 204 and 206 respectively of three photovoltaic junctions used in a single multi-junction cell designed to absorb different parts of the solar spectrum. The first photovoltaic junction having the largest band gap has an absorption spectrum 206, the second photovoltaic junction has an absorption spectrum 204, and the third photovoltaic junction which has the smallest band gap has an absorption spectrum 202. Combining the three pn junctions of photovoltaic junctions into a single multi-junction 30 cell increases the efficiency, theoretically to about 60% and practically today to above 40%.

FIG. 3 illustrates multiple multi-junction cells 30 connected in series. Each multi-junction cell 30 has three serially connected photovoltaic junctions 300, 302, and 304 which operate with three absorption spectra 206, 204 and 202 respectively. Multiple multi-junction cells 30 connected in series form a multi-spectral photovoltaic panel 3000 with output terminals 310 and 308.

FIG. 4 illustrates characteristic current-voltage curves of a single photovoltaic junction cell at different illumination levels. Curve 400 shows the maximum power point (MPP) for low light levels, curve 402 show the maximum power point MPP for higher light levels, and curve 404 shows the maximum power point MPP yet higher light levels assuming a constant temperature of the cell. As can be seen, at the different light levels the maximum power point is achieved at nearly identical voltages, but at different currents depending on the incident solar irradiance.

Reference is now made to conventional art in FIG. 5a and 5b which shows a typical photovoltaic installation 50 operating in dark or partially shaded conditions and bright mode respectively. Bypass diodes 500a-500c are connected in parallel across photovoltaic panels 502a-502c respectively for instance according to IEC61730-2 solar safety standards (sec. 10.18). Photovoltaic panels 502a-502c are connected in series to form a serial string of photovoltaic panels. Referring to FIG. 5a, bypass diode 500a provides a path 510 around photovoltaic panel 502a during dark or partially shaded conditions. Current path 510 allows current to flow through bypass diode 500a in the forward mode, preventing common thermal failures in photovoltaic panel 502a like cell breakdown or hot spots. During forward mode, bypass diode 500a preferably has low forward resistance to reduce the wasted power. FIG. 5b refers to normal operation or bright mode, forward current 512 will flow through photovoltaic panels 502a-502c while bypass diodes 500a-500c will operate in the reverse blocking mode. In reverse blocking mode, it is important that bypass diodes 500a-500c have the lowest high temperature reverse leakage current (IR) to achieve the highest power generation efficiency for each photovoltaic panel 502a-502c.

BRIEF SUMMARY

According to the present invention there is provided a circuit including multiple direct current (DC) voltage inputs which including one or more shared terminals. A primary transformer winding includes a high voltage end and a low voltage end. The primary transformer winding has a tap or taps operatively connected to the shared terminals through a first switch. A secondary transformer winding includes a high voltage end and a low voltage end. The secondary transformer winding is electromagnetically coupled to the primary transformer winding. The secondary transformer winding has one or more taps operatively connected to the shared terminal(s) through a second switch. A direct current voltage output terminal connects the high voltage ends of the primary and secondary transformer windings. A low voltage direct current output terminal operatively connecting said low voltage ends of said primary and secondary transformer windings. Diodes are typically connected in parallel with the first and second switches or the diodes are integrated with a transistor in a single package. The switches may be metal oxide semiconductor field effect transistor (MOSFET), junction field effect transistor (JFET), insulated gate field effect transistor (IG-FET), n-channel field effect transistor, p-channel field effect transistor, silicon controlled rectifier (SCR) and/or bipolar junction transistor (BJT). A third switch optionally connects the low voltage end of the primary transformer winding to a common terminal; and a fourth switch optionally connects the low voltage end of the secondary transformer winding to the common terminal. Diodes are typically connected in parallel with the third switch and the fourth switch. Bypass diodes are operatively connected across the DC voltage inputs. Photovoltaic cells are optionally connected to the DC voltage inputs. The photovoltaic cells may be optimized for maximal optical absorption of different respective portions of the electromagnetic spectrum. The direct current voltage output terminal may be connected to a DC to DC converter.

According to the present invention there is provided a circuit including multiple direct current (DC) voltage inputs; multiple transformers including primary windings and secondary windings; multiple first switches connected respectively in series with the primary windings into a multiple of switched primary windings; and multiple second switches connected respectively in series with the secondary windings into multiple switched secondary windings. The switched secondary windings are parallel connected respectively with the switched primary windings by the DC voltage inputs. The switched secondary windings are adapted for connecting to a combined direct current power output combining the DC voltage inputs. The first and second switches are: metal oxide semiconductor field effect transistor (MOSFET), junction field effect transistor (JFET), insulated gate field effect transistor (IGFET), n-channel field effect transistor, p-channel field effect transistor, silicon controlled rectifier (SCR) and/or bipolar junction transistor (BJT).

According to the present invention there is provided a circuit for combining direct current (DC) power including multiple direct current (DC) voltage inputs; multiple tapped coils including respectively primary ends, secondary ends and taps. The taps are adapted for connecting individually to the DC voltage inputs. The first switches connect respectively in series with the tapped coils at the primary ends of the coils. The second switches connect respectively in series with the coils at the secondary ends of the coils. The taps serially connect respectively the first and second switches. A combined direct current power output is adapted for connecting between the tap of highest voltage and a reference to both the inputs and the output.

According to the present invention there is provided a circuit for combining direct current (DC) power including multiple direct current (DC) voltage inputs; multiple inductive elements. The inductive elements are adapted for operatively connecting respectively to the DC voltage inputs. Multiple switches connect respectively with the inductive elements. A controller is configured to switch the switches periodically. A direct current voltage output is connected across one of the DC voltage inputs and a reference to both the inputs and the output.

According to the present invention there is provided a method for combining direct current (DC) power. Multiple direct current (DC) voltage inputs are connected to respective inductive elements. Multiple switches are connected respectively with the inductive elements. The switches are switched periodically.

A direct current voltage output is combined by connecting across one of the DC voltage inputs and a reference common to both the DC voltage inputs and the direct current voltage output.

BRIEF DESCRIPTION OF THE DRAWINGS

The invention is herein described, by way of example only, with reference to the accompanying drawings, wherein.

Figure 1:
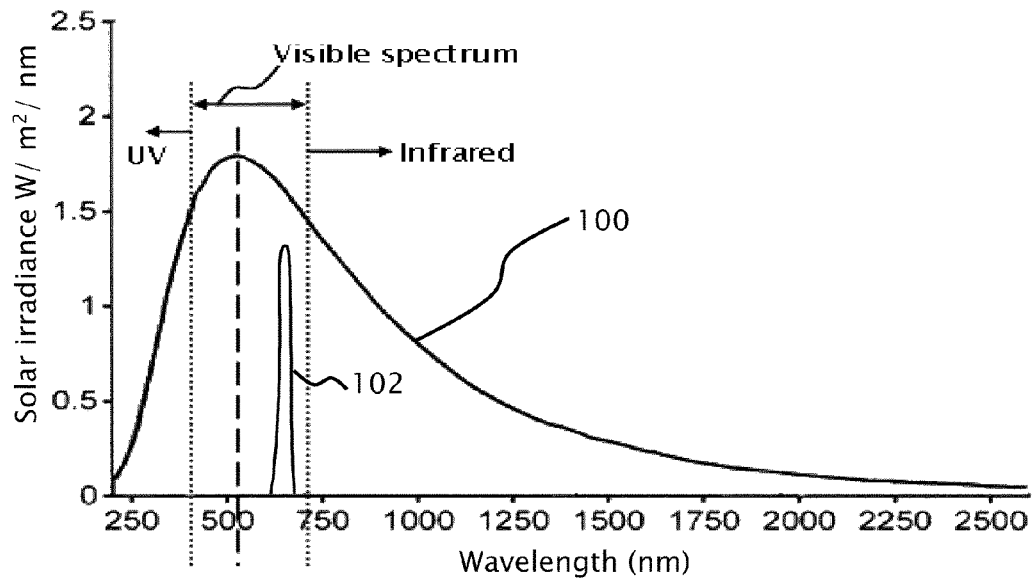
FIG. 1 is a graph illustrating typical spectra of solar irradiance and solar absorption of a single photovoltaic junction, according to conventional art.
Figure 2:
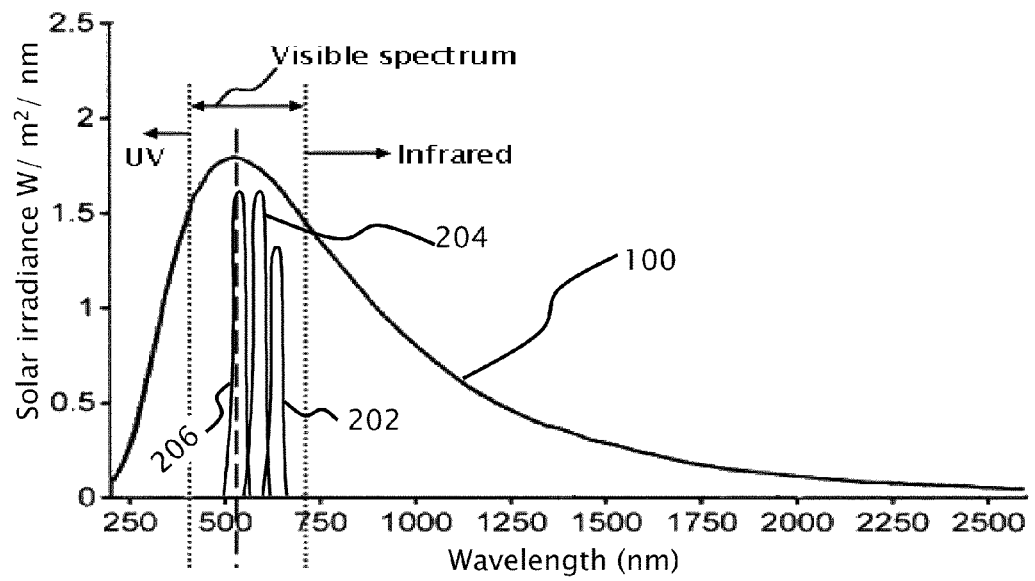
FIG. 2 is a graph illustrating three different absorption spectra of three stacked photovoltaic junctions of a multi-junction photovoltaic cell, according to conventional art.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

By way of introduction, different embodiments of the present invention are directed toward compensating for current variations in multiple junctions cells or in serially connected photovoltaic cells and/or panels such as during partial shading while maximizing power gain, by avoiding the loss of power from one or more photovoltaic cells and/or panels shorted by the cells and/or panels respective bypass diode.

Figure 3:
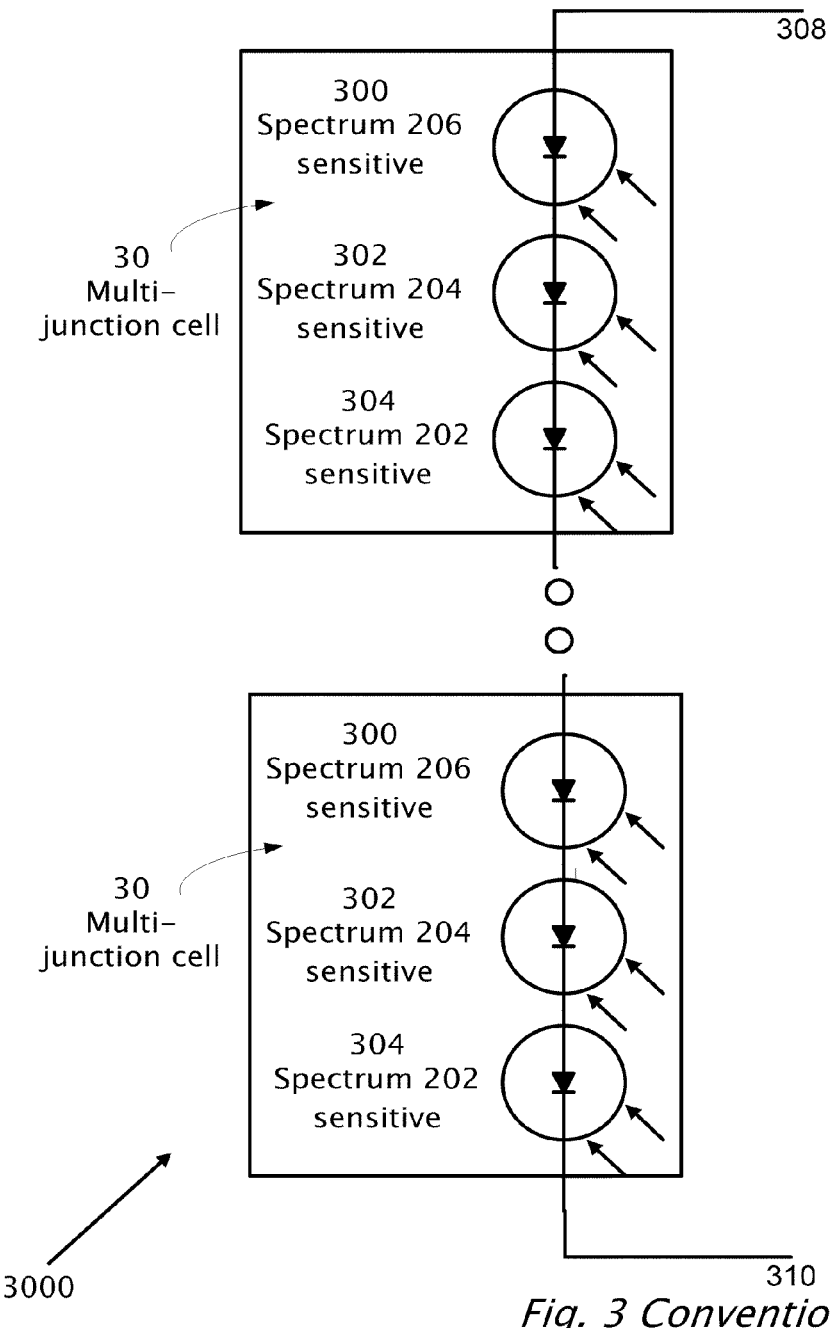
FIG. 3 illustrates serially connected multi-junction cells, according to conventional art.
Figure 4:
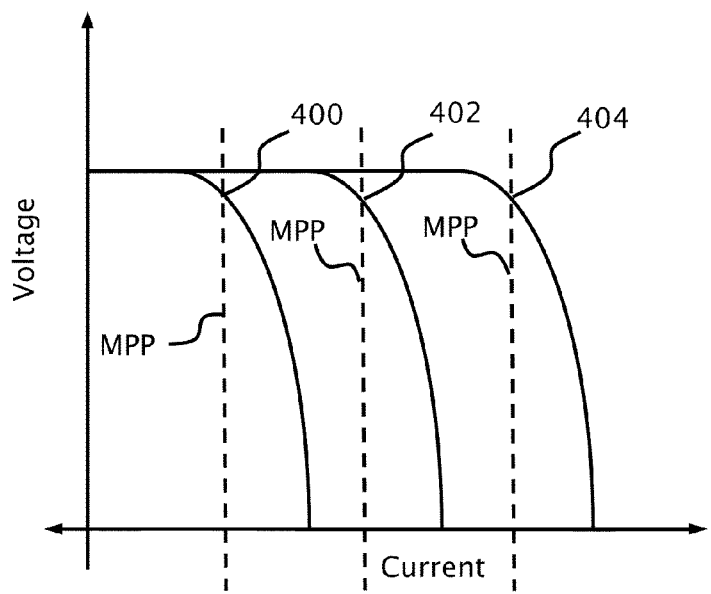
FIG. 4 illustrates a current-voltage (IV) characteristic curve (arbitrary units) of a photovoltaic cell at three different illumination levels, according to conventional art.
Figure 5A:
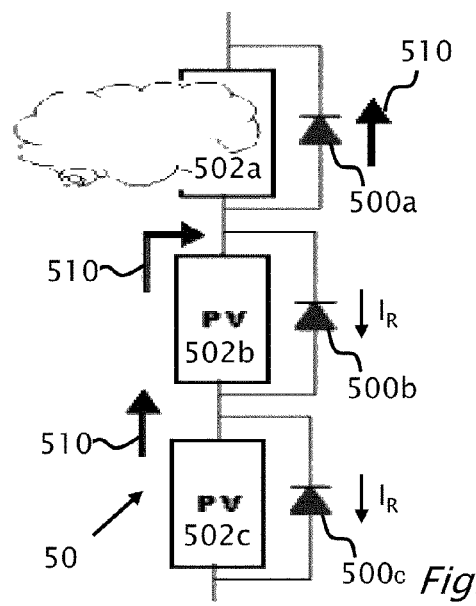
FIGS. 5a and 5b illustrates a typical photovoltaic installation operating in during dark or partially shaded conditions and bright mode respectively, according to conventional art.
Figure 5B:
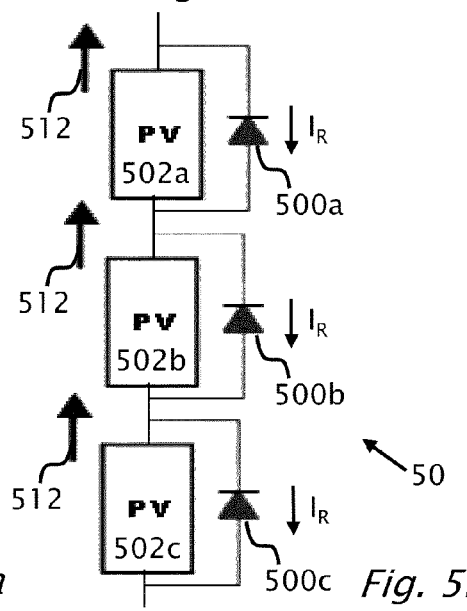

Reference is now made back to FIG. 3, which illustrates conventionally multiple multi-junction cells 30 connected in series, each with multiple serially connected photovoltaic junctions 300, 302, and 304. It is well known that the spectrum of solar irradiance on the Earth's surface is not a constant but varies according to many variables such as season, geographic location, time of day, altitude, atmospheric conditions and pollution. Hence, it becomes apparent that photovoltaic junctions 300, 302, and 304 sensitive to different spectrum bands may be absorbing a different amount of light depending on season, geographic location, time of day, altitude, atmospheric conditions and pollution. Since photovoltaic junctions 300, 302, and 304 are connected in series, the same current flows through all of the junctions. Thus, the best power point of serially connected photovoltaic junctions 300, 302, and 304 maximizes the overall power from photovoltaic junctions 300, 302, and 304, while each junction is typically producing a less than optimal amount of electrical power. On the other hand, a parallel connection of photovoltaic junctions and/or multi-junction cells, while allowing a better maximum power control for all photovoltaic junctions or multi-junction cells suffers among other possible power losses from an increase of ohmic power loss of the system since ohmic power loss is proportional to the square of the current. Furthermore, a parallel electrical connection of stacked pn junctions in a multi-junction cell is not particularly practical since multi-junction cells are typically stacked in a single production process and since the MPP voltage of each of these stacked pn junctions is different; the bandgap voltage for each pn junction is different.

The present invention in different embodiments may be applied to multiple photovoltaic cells and/or multi-junction photovoltaic cells connected in various series and parallel configurations with power converters/combiners to form a photovoltaic panel. Multiple series and parallel configurations of the photovoltaic panel and substrings within a panel with multiple power converters/combiners are used to form a photovoltaic installation. The present invention in further embodiments may be applied to other direct current power sources including batteries, fuel cells and direct current generators.

Embodiments of the present invention may be implemented by one skilled in the electronics arts using different inductive circuit elements such as transformers, auto-transformers, tapped coils, and/or multiple coils connected in serial and/or in parallel and these devices may be connected equivalently to construct the different embodiments of the present invention.

The terms "common", "common terminal", "common reference" are used herein interchangeably referring to a reference common to both inputs and the output in the context of embodiments of the present invention. Typically, "common terminal" is ground, but the whole circuit may also be ungrounded. References to common terminal as ground are only illustrative and made for the reader's convenience.

Figure 6:
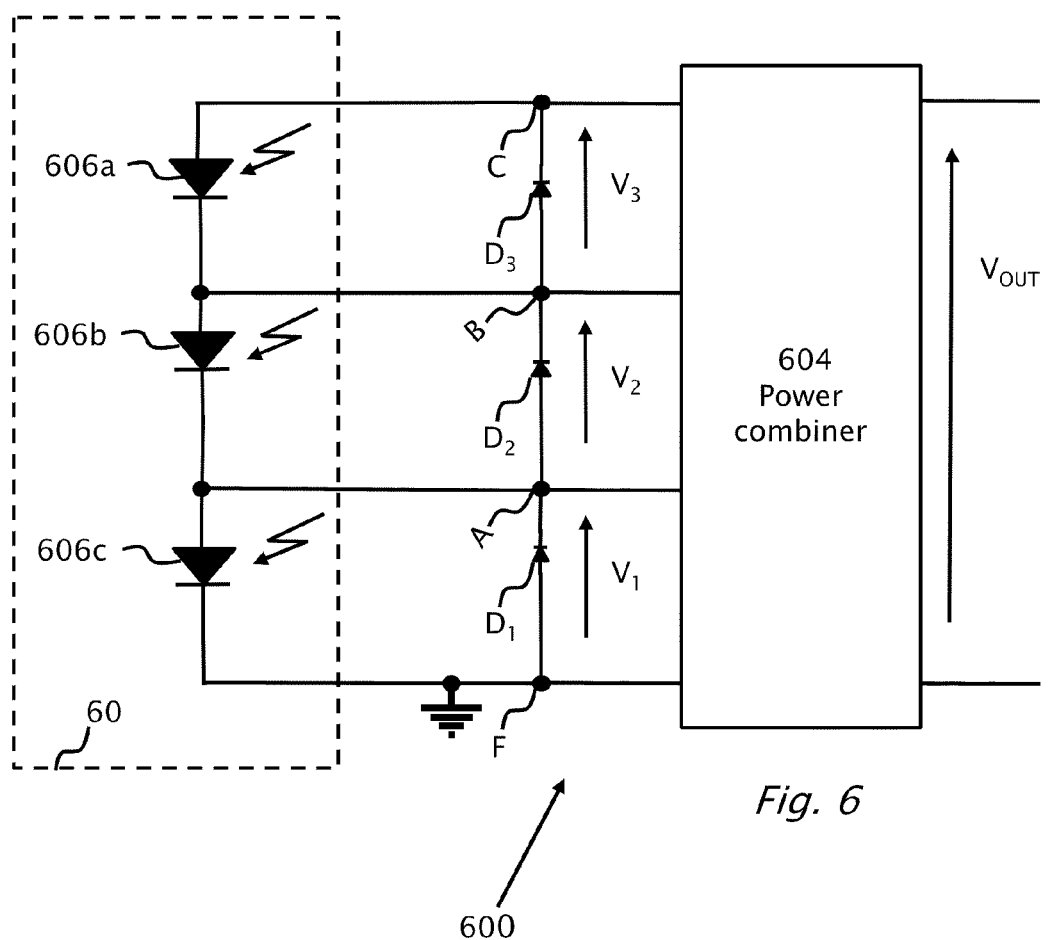
FIG. 6 illustrates a block diagram of photovoltaic installation with a power combiner according to an embodiment of the present invention.

Reference is now made to FIG. 6 which illustrates a block diagram of photovoltaic installation 600 with a power combiner 604 according to an embodiment of the present invention. A photovoltaic panel 60 has three photovoltaic cells 606a-606c connected in series. Photovoltaic cells 606a-606c are preferably multi-junction photovoltaic cells, photovoltaic cells or other direct current sources. An anode and cathode of a bypass diode $D_1$ connects across in parallel with photovoltaic cell 606c at node F and node A respectively. An anode and cathode of a bypass diode $D_2$ connects across in parallel with photovoltaic cell 606b at node A and node B respectively. An anode and cathode of a bypass diode $D_3$ connects across in parallel with photovoltaic cell 606a at node B and node C respectively. Voltages $V_1$, $V_2$ and $V_3$ are the voltage outputs of photovoltaic cells 606c, 606b and 606a respectively. Voltages $V_1$, $V_2$ and $V_3$ are applied to three voltage inputs of power combiner 604 as between nodes C & B, B & A and nodes A & F respectively. Power combiner 604 has a single output voltage $V_{out}$.

Figure 7:
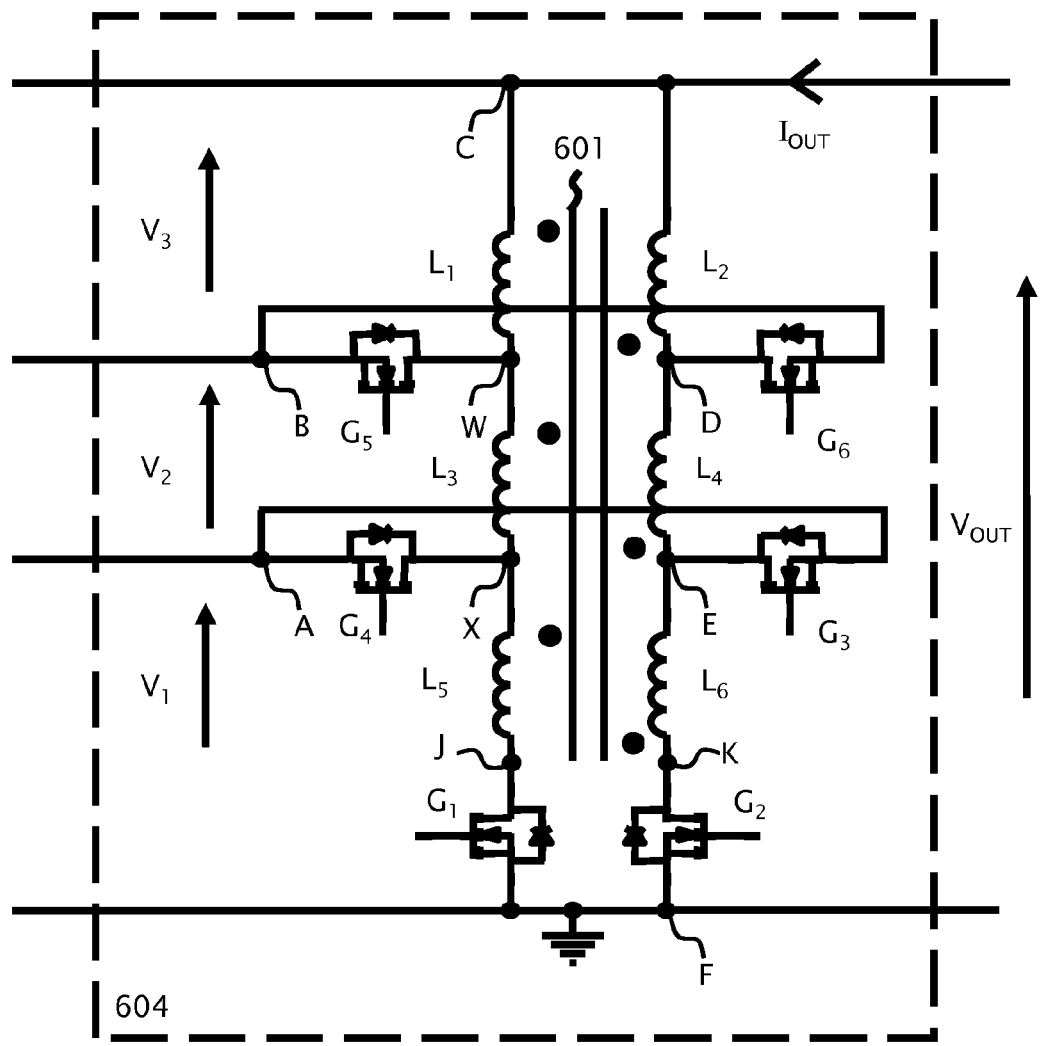
FIG. 7 illustrates a power combiner circuit, according to an embodiment of the present invention.

Reference is now made to FIG. 7 which illustrates, according to an embodiment of the present invention, circuit details of DC power combiner 604. Three voltages $V_1$, $V_2$ and $V_3$ are input to power combiner 604 between nodes A and F, nodes B and A and nodes C and B respectively. Node B is on a "shared input terminal" of $V_2$ and $V_3$. Similarly, node A is on a "shared input terminal" of $V_1$ and $V_2$. One end of inductor $L_1$ connects to node C (e.g., a "high voltage input terminal"), the other end of inductor $L_1$ connects to one end of inductor $L_3$ to form node W. The other end of inductor $L_3$ connects to one end of inductor $L_5$ to form node X. The other end on inductor $L_5$ connects to the drain of MOSFET $G_1$ to form node J and the source of $G_1$ connects to node F (ground). One end of inductor $L_2$ connects to node C, the other end of inductor $L_2$ connects to one end of inductor $L_4$ to form node D. The other end of inductor $L_4$ connects to one end of inductor $L_6$ to form node E. The other end on inductor $L_5$ connects to the drain of MOSFET $G_2$ to form node K and the source of MOSFET $G_2$ connects node F (ground, e.g., a "low voltage input terminal"). The drain of MOSFET $G_5$ is connected to node W, the source of MOSFET $G_5$ connects to the source of MOSFET $G_6$. The drain of MOSFET $G_6$ connects to node D. The drain of MOSFET $G_4$ is connected to node X, the source of MOSFET $G_4$ connects to the source of MOSFET $G_3$. The drain of MOSFET $G_3$ connects to node E. The output voltage $V_{out}$ of power combiner 604 is derived between nodes C and F (ground). L1 and L3 and L5 together form a primary transformer winding having a high voltage end (node C), a low voltage end (node J), and taps (nodes W and X). L2 and L4 and L6 together form a secondary transformer winding having a high voltage end (node C), a low voltage end (node K), and taps (nodes D and E). A transformer core 601 is used to electromagnetically couple all inductors $L_5, L_6, L_3, L_4, L_1$ and $L_2$. The winding polarity of $L_5$, $L_3$ and $L_1$ is preferably opposite of the winding polarity of $L_6$, $L_4$ and $L_2$. The two inductors within each of the inductor pairs $L_5$-$L_6$, $L_3$-$L_4$ and $L_1$-$L_2$ typically have the same number of winding turns, although there can be a different number of turns to each of the inductor pairs (eg. L1 and L2, L3 and L4 and L5 and L6), to adjust the typical relative MPP voltage of each of the input voltages. Each of the three voltages $V_1$, $V_2$ and $V_3$ are applied across each of inductors $L_5$, $L_3$ and $L_1$ respectively with for instance a 50% duty cycle when switches G1, G4 and G5 are closed and switches G2, G3 and G6 are opened. Each of the three voltages $V_1$, $V_2$ and $V_3$ are applied across each of the inductors $L_6$, $L_4$ and $L_2$ respectively with typically a 50% duty cycle when switches G1, G4 and G5 are opened and switches G2, G3 and G6 are closed, thus completing a full switching cycle. The output voltage ($V_{OUT}$) of power combiner 604 is the sum of the input voltages $V_1$, $V_2$ and $V_3$ and is output on a direct current voltage output terminal connected to node C and a low voltage direct current common terminal connected to node F. The input voltages $V_1$, $V_2$ and $V_3$ of power combiner 604 are forced by power combiner 604 to have the same ratio as the winding ratio of their inductor pair ($L_5$, $L_6$), ($L_3$, $L_4$) and ($L_1$, $L_2$) respectively; a result of applying control pulses to switches $G_1$-$G_6$ for instance with a 50% duty cycle. Switches $G_1$-$G_6$ are optionally metal oxide semiconductor field-effect transistors (MOSFET). Alternatively the switches can, in different embodiments of the invention, be a silicon controlled rectifier (SCR), insulated gate bipolar junction transistor (IGBT), bipolar junction transistor (BJT), field effect transistor (FET), junction field effect transistor (JFET), switching diode, mechanically operated single pole double pole switch (SPDT), SPDT electrical relay, SPDT reed relay, SPDT solid state relay, insulated gate field effect transistor (IGFET), DIAC, and TRIAC.

Figure 8:
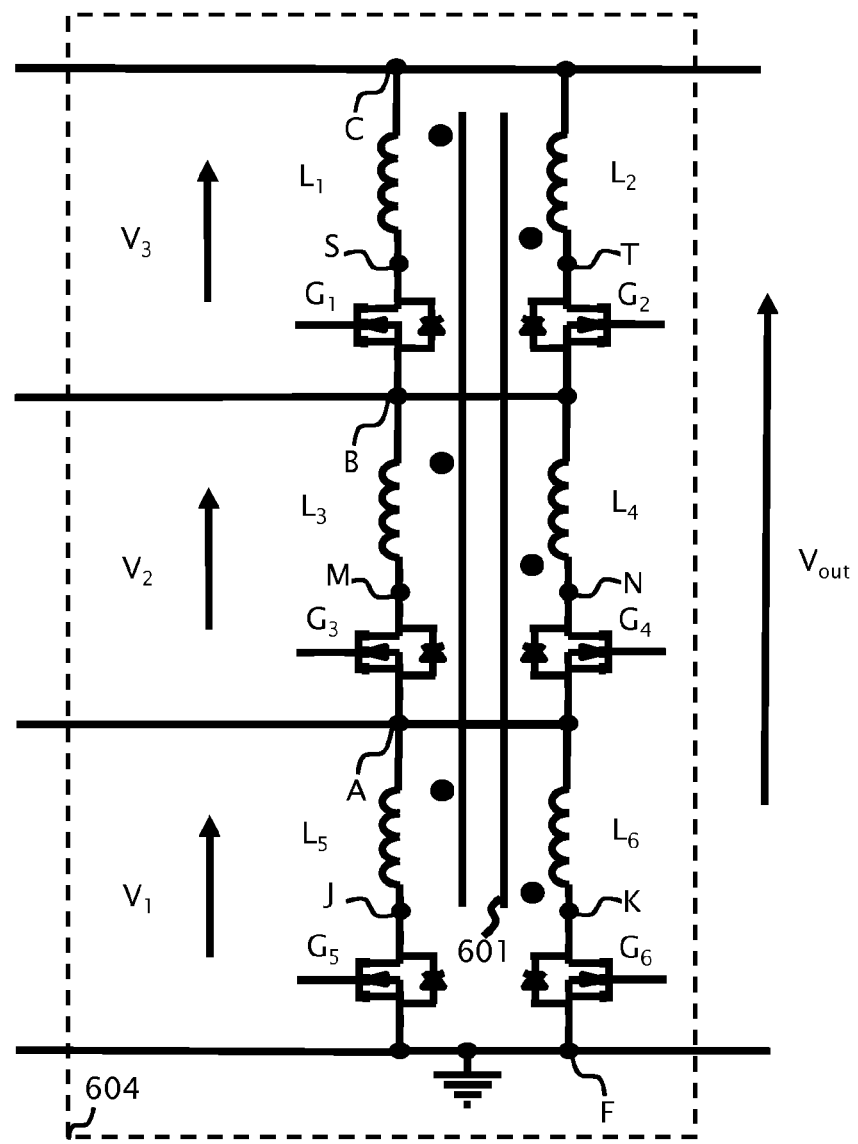
FIG. 8 illustrates a power combiner circuit, according to another embodiment of the present invention.

Reference is now made to FIG. 8 which illustrates, according to another embodiment of the present invention, an alternative circuit of DC power combiner 604. Three voltages $V_1$, $V_2$ and $V_3$ are input to power combiner 604 between nodes A & F, B & A and nodes C & B respectively. Nodes A, B, C and F form direct current (DC) voltage input terminals. One end of inductor $L_1$ connects to node C, the other end of inductor $L_1$ connects to the drain of MOSFET $G_1$ the source of $G_1$ connects to node B. One end of inductor $L_3$ connects to node B, the other end of inductor $L_3$ connects to the drain of MOSFET $G_3$, the source of $G_3$ connects to node A. One end of inductor $L_5$ connects to node A, the other end of inductor $L_5$ connects to the drain of MOSFET $G_5$, the source of $G_5$ connects to node F (ground or common reference). One end of inductor $L_2$ connects to node C, the other end of inductor $L_2$ connects to the drain of MOSFET $G_2$, the source of $G_2$ connects to node B. One end of inductor $L_4$ connects to node B, the other end of inductor $L_4$ connects to the drain of MOSFET $G_4$, the source of $G_4$ connects to node A. One end of inductor $L_6$ connects to node A, the other end of inductor $L_6$ connects to the drain of MOSFET $G_6$, the source of $G_6$ connects to node F (ground). The output voltage $V_{out}$ across two DC output terminals of power combiner 604 is derived between nodes C and F (ground). A transformer core 601 is used to electromagnetically couple all inductors $L_5$, $L_6$, $L_3$, $L_4$, $L_1$ and $L_2$. The winding polarity of $L_5$, $L_3$ and $L_1$ is preferably opposite of the winding polarity of $L_6$, $L_4$ and $L_2$ respectively. The two inductors within each of the inductor pairs ($L_5$ and $L_6$), ($L_3$ and $L_4$) and ($L_1$ and $L_2$) preferably have the same number of winding turns, and each inductor pair form a respective transformer with primary windings (e.g., L1, L3, and L5) and secondary windings (L2, L4, and L6), although there can be a different number of turns to each of the inductor pairs, so as to adjust the typical relative MPP voltage of each of the input voltages.

According to an embodiment of the present invention there is provided a circuit for combining direct current (DC) power including multiple direct current (DC) voltage inputs (e.g., nodes A, B, C and F); multiple tapped coils including respectively primary ends, secondary ends and taps, and the taps are adapted for connecting individually to the DC voltage inputs. For example: L1 and L2 form a tapped coil with its tap connected to node C and its primary end connected to S and its secondary end connected to T, L3 and L4 form a tapped coil with its tap connected to node B and its primary end connected to M and its secondary end connected to N, and L5 and L6 form a tapped coil with its tap connected to node A and its primary end connected to J and its secondary end connected to K. The first switches (e.g., G1, G3, and G5) connect respectively in series with the tapped coils at the primary ends of the coils (e.g., at nodes S, M, and J).. The second switches (G2, G4, and G6) connect respectively in series with the coils at the secondary ends of the coils (e.g., at nodes T, N, and K). Each tapped coil and connected switches (e.g.. L1, L2, G1, G2, and C) form a switched transformer circuit. A tap (e.g., B, of a neighboring one of the L3 and L4 tapped coil) serially connect respectively the first and second switches (e.g., of a neighboring switched transformer circuit of L1, L2, G1, G2, and C). A combined direct current power output is adapted for connecting between the tap of highest voltage and a reference to both the inputs and the output.

Figure 9:
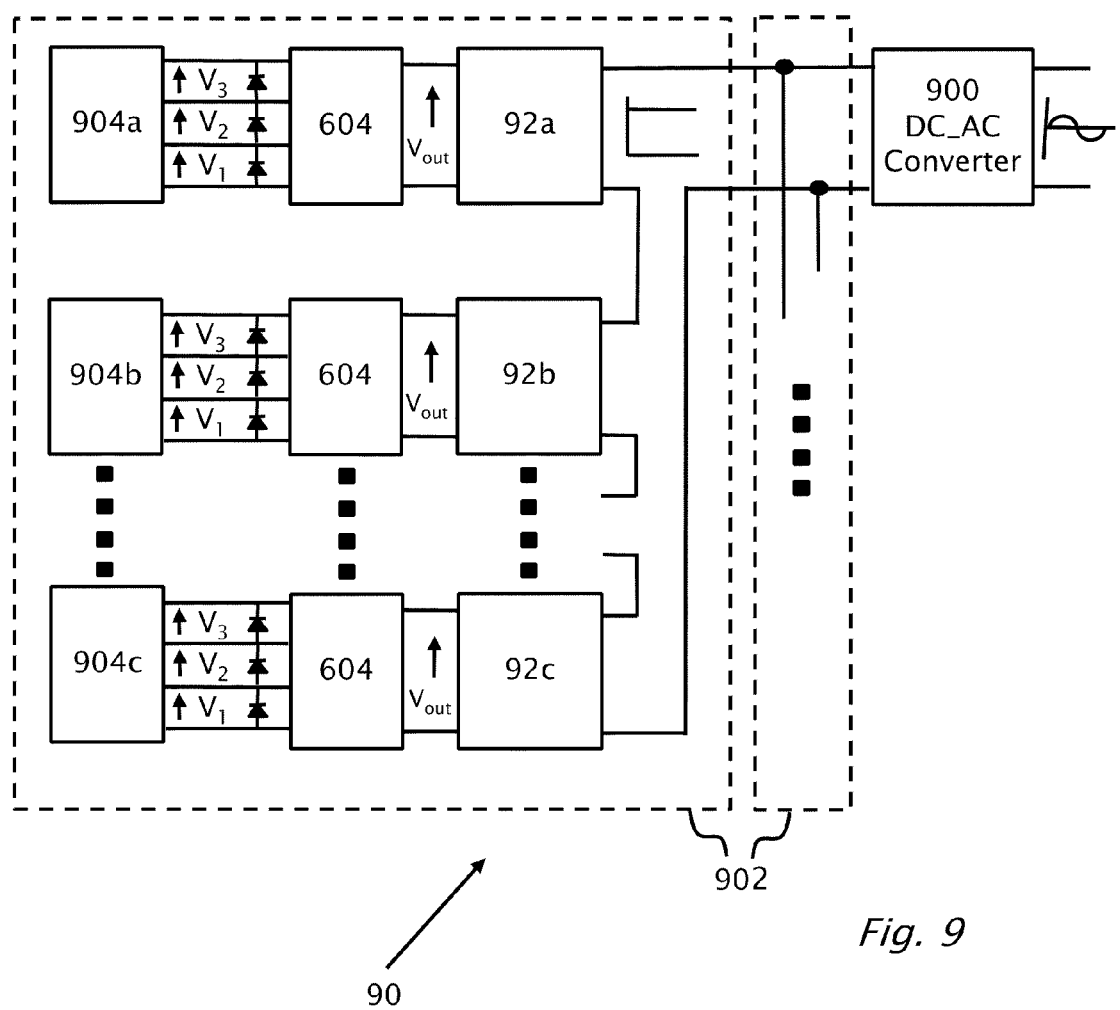
FIG. 9 illustrates a photovoltaic system including multiple power combiners, according to an exemplary embodiment of the present invention.

Reference is now made to FIG. 9 which illustrates a photovoltaic system 90 including multiple power combiners 604, according to an exemplary embodiment of the present invention. Photovoltaic system 90 has multiple series strings 902 connected in parallel to the input of DC to AC converter 900. Series strings 902 have photovoltaic cells 904a-904c which are for instance multi-junction photovoltaic cells which have three voltage outputs $V_1$, $V_2$ and $V_3$ with three bypass diodes connected across each voltage output of photovoltaic cells 904a-904c. Connected to each photovoltaic cells 904a-904c is a three voltage input power combiner 604. Power combiner 604 has a single voltage output ($V_{out}$) which is applied across the input of DC to DC converters 92a-92c. The outputs of DC to DC converters 92a-92c are connected in series to form the input to DC to AC converter 900 and the output of multiple series strings 902.

Figure 10:
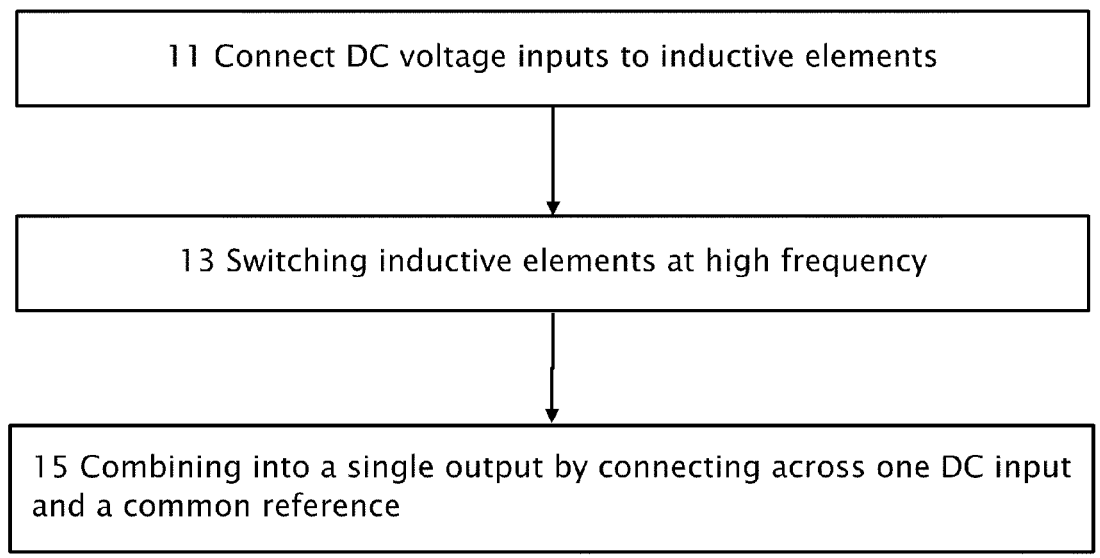
FIG. 10 illustrates a flow diagram of a method, according to an embodiment of the present invention.
Figure 10:

Reference is now made to FIG. 10 which illustrates a method 10 according to an embodiment of the present invention. In step 11, DC voltage inputs are connected to inductive elements. In step 13, the inductive elements are switched at a high frequency dependent on the inductance values so that the inductive elements do not tend to "short" the input DC voltages. In step 15, a single output combines the DC inputs by connecting across typically the highest input voltage and a reference or ground common to both the DC inputs and the single output.

The definite articles "a", "an" is used herein, such as "a multi-junction photovoltaic cell", "a power combiner" or "a coil" have the meaning of "one or more multi-junction photovoltaic cells", "one or more power combiners" or "one or more coils".

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A circuit for combining direct current (DC) power, the circuit comprising:
 a plurality of interconnected direct current (DC) voltage inputs including: at least one shared terminal, a low voltage input terminal, and a high voltage input terminal;
 a primary transformer winding including a high voltage end and a low voltage end, said primary transformer winding with at least one tap operatively connected to said at least one shared terminal through at least one first switch, wherein said low voltage input terminal operatively connects to said low voltage end of said primary transformer winding and said high voltage input terminal connects to said high voltage end of said primary transformer winding;
 a secondary transformer winding including a high voltage end and a low voltage end, said secondary transformer winding electromagnetically coupled to said primary transformer winding, wherein said secondary transformer winding includes at least one tap operatively connecting said at least one shared terminal through a at least one second switch, wherein said high voltage input terminal connects to said high voltage end of said secondary transformer winding;
 a direct current voltage output terminal connecting said high voltage ends of said primary and secondary transformer windings; and
 a low voltage direct current common terminal operatively connecting said low voltage ends of said primary and secondary transformer windings.

2. The circuit according to claim 1, further comprising a diode connected in parallel with at least one switch selected from the group consisting of: said at least one first switch and said at least one second switch.

3. The circuit according to claim 2, wherein said diode is integrated with a transistor in a single package.

4. The circuit according to claim 1, wherein said at least one first and said at least one second switches are selected from the group consisting of: a metal oxide semiconductor field effect transistor (MOSFET), a junction field effect transistor (JFET), an insulated gate field effect transistor (IGFET), an n-channel field effect transistor, a p-channel field effect transistor, silicon controlled rectifier (SCR), and a bipolar junction transistor (BJT).

5. The circuit according to claim 1, further comprising:
 a third switch operatively connecting said low voltage end of said primary transformer winding to said low voltage direct current common terminal; and
 a fourth switch operatively connecting said low voltage end of said secondary transformer winding to said low voltage direct current common terminal.

6. The circuit according to claim 5, further comprising a diode connected in parallel with at least one switch selected from the group consisting of: said third switch and said fourth switch.

7. The circuit according to claim 1, further comprising: a bypass diode operatively connected across at least two of said DC voltage inputs.

8. The circuit according to claim 1, further comprising: a plurality of photovoltaic cells connected to said DC voltage inputs.

9. The circuit according to claim 8, wherein said photovoltaic cells are optimized for maximal optical absorption of different respective portions of an electromagnetic spectrum.

10. The circuit according to claim 1, further comprising: a DC to DC converter, wherein said direct current voltage output terminal connects to said DC to DC converter.

11. The circuit of claim 1, wherein said low voltage direct current common terminal connects said low voltage end of said primary transformer winding through a third switch and wherein said low voltage direct current common terminal connects said low voltage end of said secondary transformer winding through a fourth switch.

12. A circuit for combining direct current (DC) power, the circuit comprising:
a plurality of direct current (DC) voltage input terminals;
a plurality of transformers including primary windings and secondary windings;
a plurality of first switches connecting in series said primary windings to form a plurality of series connected switched primary windings, wherein each said switched primary winding connects across two of said DC voltage input terminals;
a plurality of second switches connecting in series said secondary windings to form a plurality of series connected switched secondary windings, wherein each said switched secondary winding connects across two of said DC voltage input terminals; and
two DC output terminals connected across said series connected switched primary windings and across said series connected switched secondary windings.

13. The circuit according to claim 12, wherein said plurality of first switches and plurality of second switches are selected from the group consisting of: a metal oxide semiconductor field effect transistor (MOSFET), a junction field effect transistor (JFET), an insulated gate field effect transistor (IGFET), an n-channel field effect transistor, a p-channel field effect transistor, a silicon controlled rectifier (SCR) and a bipolar junction transistor (BJT).

14. A circuit for combining direct current (DC) power, the circuit comprising:
a plurality of direct current (DC) voltage input terminals and a common reference;
a plurality of tapped coils including respectively primary ends, secondary ends and taps; wherein said taps are adapted for connecting individually to the DC voltage input terminals;
a plurality of first switches each connecting respectively the primary end of one of the tapped coils to the tap of a neighboring one of the tapped coils; and
a plurality of second switches each connecting respectively the secondary end of one of the tapped coils to the tap of a neighboring one of the tapped coils;
wherein said common reference connects to the primary end of a last one of the tapped coils through another first switch and the common reference connects to the secondary end of the last one of the tapped coils through another second switch.

15. The circuit according to claim 14, wherein a combined direct current power output is adapted for connecting between the tap of highest voltage and said common reference.

16. A method for combining direct current (DC) power, the method using a circuit, comprising:
a plurality of interconnected direct current (DC) voltage inputs including: at least one shared terminal, a low voltage input terminal, and a high voltage input terminal;
a primary transformer winding including a high voltage end and a low voltage end, said primary transformer winding with at least one tap operatively connected to said at least one shared terminal through at least one first switch, wherein said low voltage input terminal operatively connects to said low voltage end of said primary transformer winding and said high voltage input terminal connects to said high voltage end of said primary transformer winding;
a secondary transformer winding including a high voltage end and a low voltage end, said secondary transformer winding electromagnetically coupled to said primary transformer winding, wherein said secondary transformer winding includes at least one tap operatively connecting said at least one shared terminal through at least one second switch, wherein said high voltage input terminal connects to said high voltage end of said secondary transformer winding;
a direct current voltage output terminal connecting said high voltage ends of said primary and secondary transformer windings; and
a low voltage direct current common terminal operatively connecting said low voltage ends of said primary and secondary transformer windings;
the method comprising:
operatively connecting said direct current (DC) voltage inputs to said primary and secondary transformer windings and said switches; and
periodically switching said switches.

17. A circuit comprising:
a plurality of direct current (DC) voltage inputs including one or more shared input terminals, a low voltage input terminal, and a high voltage input terminal;
a primary transformer winding including a primary high voltage terminal having an operative connection to the high voltage input terminal, a primary low voltage terminal having an operative connection to the low voltage input terminal, and one or more primary taps;
a secondary transformer winding including a secondary high voltage terminal having an operative connection to the high voltage input terminal, a secondary low voltage terminal having an operative connection to the low voltage input terminal, and one or more secondary taps, wherein the secondary transformer winding is electromagnetically coupled to the primary transformer winding;
one or more first switches each connecting one of the one or more shared input terminals to a respective one of the one or more primary taps; and
one or more second switches each connecting one of the one or more shared input terminals to a respective one of the one or more secondary taps.

18. The circuit according to claim 17, further comprising:
a third switch, wherein the operative connection of the primary low voltage terminal to the low voltage input terminal is through the third switch; and
a fourth switch, wherein the operative connection of the secondary low voltage terminal to the low voltage input terminal is through the fourth switch.

19. The circuit according to claim 17, further comprising two or more photovoltaic cells optimized for maximal optical absorption of different portions of an electromagnetic spectrum, wherein each of the two or more photovoltaic cells is operatively connected across a different pair of the plurality of direct current (DC) voltage inputs.

20. The circuit of claim 17, further comprising a transformer core, wherein the secondary transformer winding is electromagnetically coupled in opposite polarity through the transformer core to the primary transformer winding.

21. The circuit according to claim 20, further comprising a combined direct current power output having a voltage output terminal connected to the first end terminal and a common reference terminal connected to the second end terminal.

22. A circuit comprising:
a plurality of direct current (DC) voltage input terminals; and
a plurality of switched transformer circuits each having first and second terminals;
wherein the plurality of switched transformer circuits are connected in series to form a series circuit having a first end terminal, a second end terminal, and intermediate terminals, each of the first end and second end and intermediate terminals respectively connected to one of the plurality of DC voltage input terminals; and
wherein each switched transformer circuit includes first and second switches each having a first terminal connected the first terminal of the switched transformer circuit; and a coil including a primary terminal connected to a second terminal of the first switch, a secondary terminal connected to a second terminal of the second switch, and a tap connected to the second terminal of the switched transformer circuit.

* * * * *